(12) United States Patent
Tada et al.

(10) Patent No.: US 7,892,127 B2
(45) Date of Patent: Feb. 22, 2011

(54) POWER TRANSMISSION CHAIN AND POWER TRANSMISSION DEVICE

(75) Inventors: Seiji Tada, Nara (JP); Shigeo Kamamoto, Kashiwara (JP)

(73) Assignee: JTEKT Corporation, Osaka (JP)

( * ) Notice: Subject to any disclaimer, the term of this patent is extended or adjusted under 35 U.S.C. 154(b) by 95 days.

(21) Appl. No.: 11/883,722

(22) PCT Filed: Feb. 3, 2006

(86) PCT No.: PCT/JP2006/001893

§ 371 (c)(1),
(2), (4) Date: Aug. 3, 2007

(87) PCT Pub. No.: WO2006/082937

PCT Pub. Date: Aug. 10, 2006

(65) Prior Publication Data

US 2008/0161148 A1  Jul. 3, 2008

(30) Foreign Application Priority Data

Feb. 4, 2005 (JP) .............................. 2005-029574
Oct. 14, 2005 (JP) .............................. 2005-301033

(51) Int. Cl.
 F16G 5/18 (2006.01)
 F16G 13/04 (2006.01)
 F16H 9/24 (2006.01)

(52) U.S. Cl. ...................... 474/245; 474/206; 474/212; 474/214; 474/215; 474/229

(58) Field of Classification Search ................. 474/245, 474/155, 215, 229, 201, 206, 242, 230, 217, 474/226; 451/449, 542, 544; *F16G 5/18*
See application file for complete search history.

(56) References Cited

U.S. PATENT DOCUMENTS 1,651,832 A * 12/1927 Morse ......................... 474/216
3,120,723 A *  2/1964 Jessup ......................... 451/166
4,581,001 A *  4/1986 Rattunde et al. ............. 474/214

(Continued)

FOREIGN PATENT DOCUMENTS

DE         44 29 223 C 1        8/1995

(Continued)

*Primary Examiner*—Robert A Siconolfi
*Assistant Examiner*—San Aung
(74) *Attorney, Agent, or Firm*—Rabin & Berdo, PC

(57) ABSTRACT

A chain (1) includes plural links (2) and plural pairs of first and second pins (3 and 4) to couple the links each other. The first pin (3) comes into rolling and sliding contact with the second pin (4) at the contact portion (D). The first pin (3) includes a pair of end faces (17) opposing each other in the chain width direction (W), and a contact region (24) that comes into contact with the corresponding sheave surfaces of the pulley is formed in each end face (17). The contact region (24) includes the center point of contact (M). The first pin (3) includes a first type pin (3a) and a second type pin (3b). When the linear region of the chain (1) is viewed in the chain width direction (W), the relative position of the contact portion (D) and the center point of contact (M) is different between the first type pin (3a) and the second type pin (3b).

22 Claims, 19 Drawing Sheets

U.S. PATENT DOCUMENTS

| | | |
|---|---|---|
| 5,427,583 A | 6/1995 | Wolf |
| 5,728,021 A | 3/1998 | van Rooij et al. |
| 6,346,058 B1 * | 2/2002 | Linnenbrugger et al. .... 474/215 |
| 6,432,011 B1 | 8/2002 | Kanehira et al. |
| 6,524,204 B2 * | 2/2003 | Wakabayashi et al. ...... 474/215 |
| 6,793,564 B1 * | 9/2004 | Lupi .......................... 451/178 |
| 2005/0187057 A1 * | 8/2005 | Lou ........................... 474/245 |

FOREIGN PATENT DOCUMENTS

| | | |
|---|---|---|
| EP | 0 643 240 A1 | 3/1995 |
| EP | 1 555 455 A2 | 7/2005 |
| EP | 1 688 640 A1 | 8/2006 |
| EP | 1 698 800 A1 | 9/2006 |
| GB | 2 195 165 A | 3/1988 |
| JP | 63-201248 | 12/1988 |
| JP | 01-169149 | 7/1989 |
| JP | 01-169150 | 7/1989 |
| JP | 5-22666 | 3/1993 |
| JP | 8-312725 | 11/1996 |
| JP | 2004-190829 | 7/2004 |
| JP | 2004-301257 | 10/2004 |

\* cited by examiner

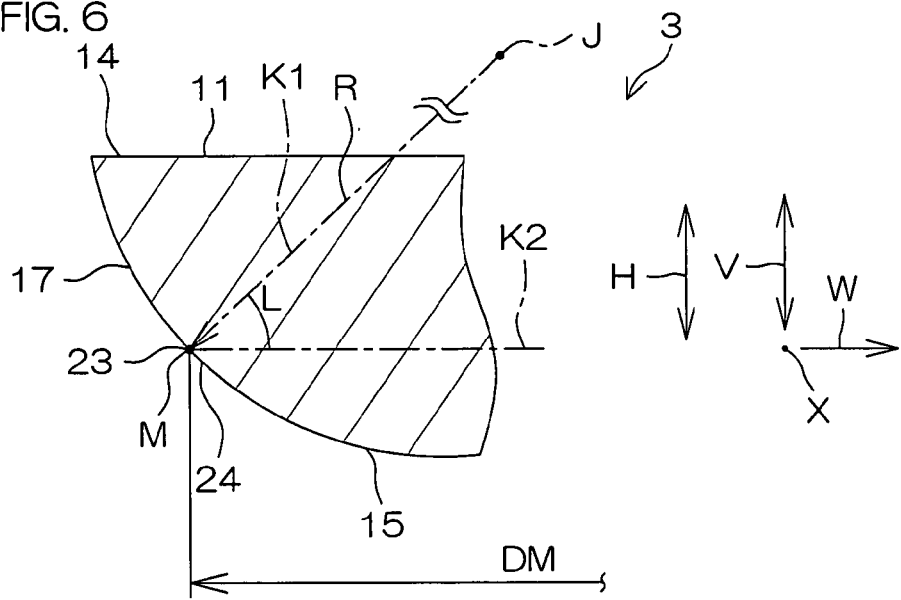
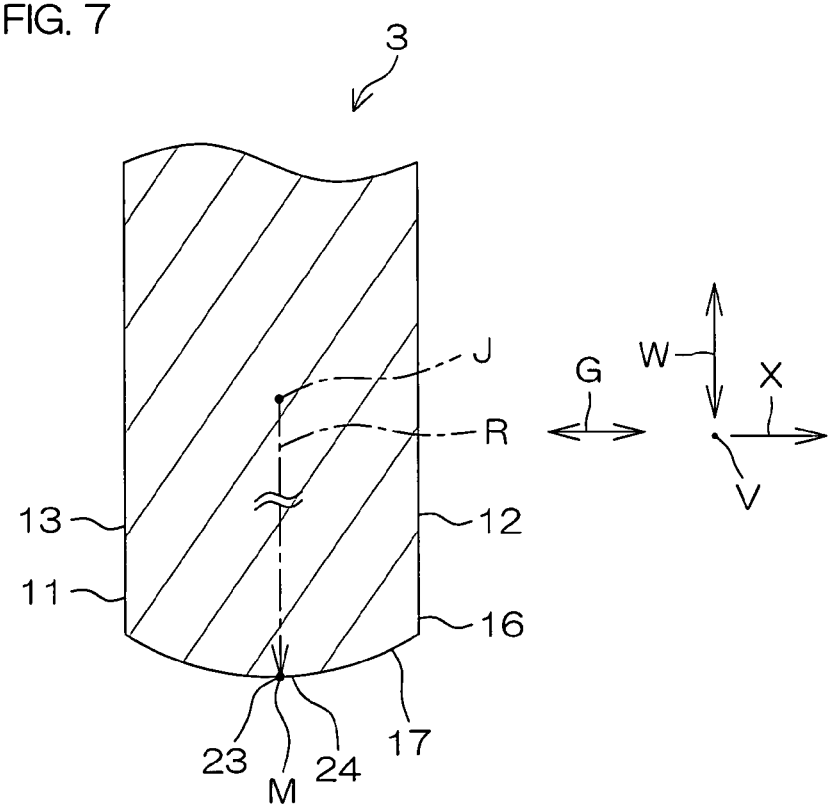

COMPARATIVE EXAMPLE 1

COMPARATIVE EXAMPLE 2

EXAMPLE 1

EXAMPLE 2

POWER TRANSMISSION CHAIN AND POWER TRANSMISSION DEVICE

TECHNICAL FIELD

The present invention relates to a power transmission chain and a power transmission device.

BACKGROUND ART

An endless power transmission chain used in a power transmission device, such as a pulley type CVT (Continuously Variable Transmission) in an automobile, includes a type formed by aligning plural links in the chain travel direction and linking adjacent links with a pin (for example, see Patent Documents 1 through 6). The power transmission chain of this type transmits power to the pulleys since a pair of end portions of the pin comes into contact with the tapered discs of the pulleys.

Patent Document 1: Japanese Unexamined Patent Publication No. 8-312725

Patent Document 2: Japanese Unexamined Patent Publication No. 2004-301257

Patent Document 3: Japanese Unexamined Patent Publication No. 2004-190829

Patent Document 4: Japanese Unexamined Patent Publication No. 1-169149

Patent Document 5: Japanese Unexamined Patent Publication No. 1-169150

Patent Document 6: Japanese Unexamined Utility Model Publication No. 63-201248

DISCLOSURE OF THE INVENTION

Problems that the Invention is to Solve

Accordingly, when the power transmission chain is driven, each of the pins is successively meshed with the pulleys and collisions of the pin and the pulleys in cycles give rise to sounds of collision. These sounds of collision cause noises and are undesirable in achieving a noise reduction. The invention is devised in view of the foregoing background, and therefore has an object to provide a power transmission chain capable of reducing noises further and a power transmission device including the same.

Means for Solving the Problems

In order to achieve the above object, according to a preferred aspect of the invention, a power transmission chain that undergoes a transition alternately between a linear region and a region wound over a pulley includes plural link plates and plural coupling members that couple the link plates to each other. The coupling members include main power transmission members. The main power transmission member includes a counter portion that opposes a counter member. The counter member includes one of a link plate corresponding to the main power transmission member or a member interposed between the corresponding link plate and the main power transmission member. The counter portion of the main power transmission member comes into contact with the counter member in a contact state including at least one of rolling contact and sliding contact at a contact portion that displaces in association with bending of the power transmission chain. Each of the main power transmission member includes a pair of end faces that oppose each other in a chain width direction. A contact region that comes into contact with a corresponding sheave surface of the pulley is formed on each of the end faces. The contact region includes a center point of contact. The main power transmission members include plural types of main power transmission members. A relative position of the contact portion and the center point of contact is different in each type of the main power transmission members when the linear region of the power transmission chain is viewed in the chain width direction.

The inventors dedicated to an assiduous study and obtained an idea of randomizing the cycles in which each of the pins successively comes into contact with the pulley in a power transmission chain. Accordingly, by distributing the frequency of sounds of contact between the pins and the pulley over a broad range, it is possible to reduce the noises further. As the result of a further assiduous study, the inventors attained the finding that for the purpose of randomizing the cycles of contact, it is effective to differentiate the relative position of the reference point of the pin with respect to the pulley and the reference point of the pin with respect to the link from one pin to another.

According to this aspect, the mesh cycles in which the respective main power transmission members are successively meshed with the pulley can be randomized. It is thus possible to randomize the cycles in which mesh sounds are made as each of the main power transmission members is successively meshed with the pulley. By distributing the frequency of these mesh sounds over a broad range, it is possible to prevent the peak from being generated at a particular frequency. Consequently, it is possible to reduce noises in association with the driving of the power transmission chain.

BRIEF DESCRIPTION OF THE DRAWINGS

FIG. 6 is a cross section taken on line VI-VI of FIG. 5, which is a cross section parallel to a rear portion generally at the center portion of the first pin in the thickness direction.

FIG. 7 is a cross section taken on line VII-VII of FIG. 5, which is a cross section orthogonal to the rear portion generally at the center portion of the first pin in the height direction.

BEST MODE FOR CARRYING OUT THE INVENTION

Preferred embodiments of the invention will be described with reference to the accompanying drawings.

Figure 1:
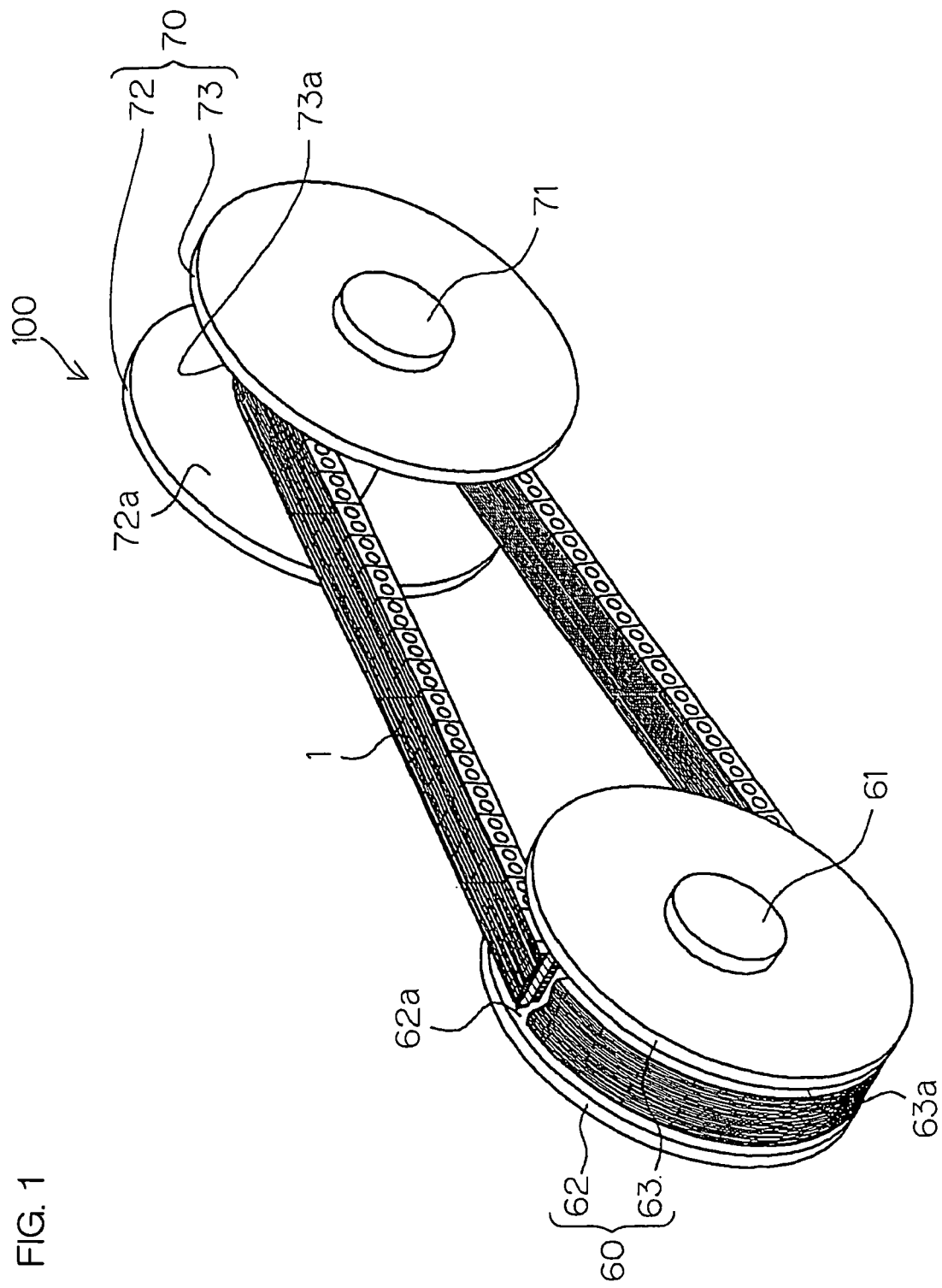
FIG. 1 is a perspective view schematically showing the configuration of a major portion of a chain type CVT as a power transmission device including a power transmission chain according to one embodiment of the invention.

FIG. 1 is a perspective view schematically showing the configuration of a major portion of a chain type CVT (hereinafter, also referred to simply as a CVT) as a power transmission device including with a power transmission chain according to one embodiment of the invention.

Referring to FIG. 1, a CVT 100 is mounted on a vehicle, such as an automobile, and includes a drive pulley 60 made of metal (structural steel or the like) serving as a first pulley, a driven pulley 70 made of metal (structural steel or the like) serving as a second pulley, and an endless power transmission chain 1 (hereinafter, also referred to simply as a chain) wound between a pair of these pulleys 60 and 70. Power is transmitted between the pair of these pulleys 60 and 70 via the chain 1. For ease of understanding, a cross section is shown in FIG. 1 for part of the chain 1.

While the CVT 100 is driven, the chain 1 undergoes a transition alternately between a linear region where it is stretched in a straight line and a region where it is wound with either one of the pulleys 60 and 70.

Figure 2:
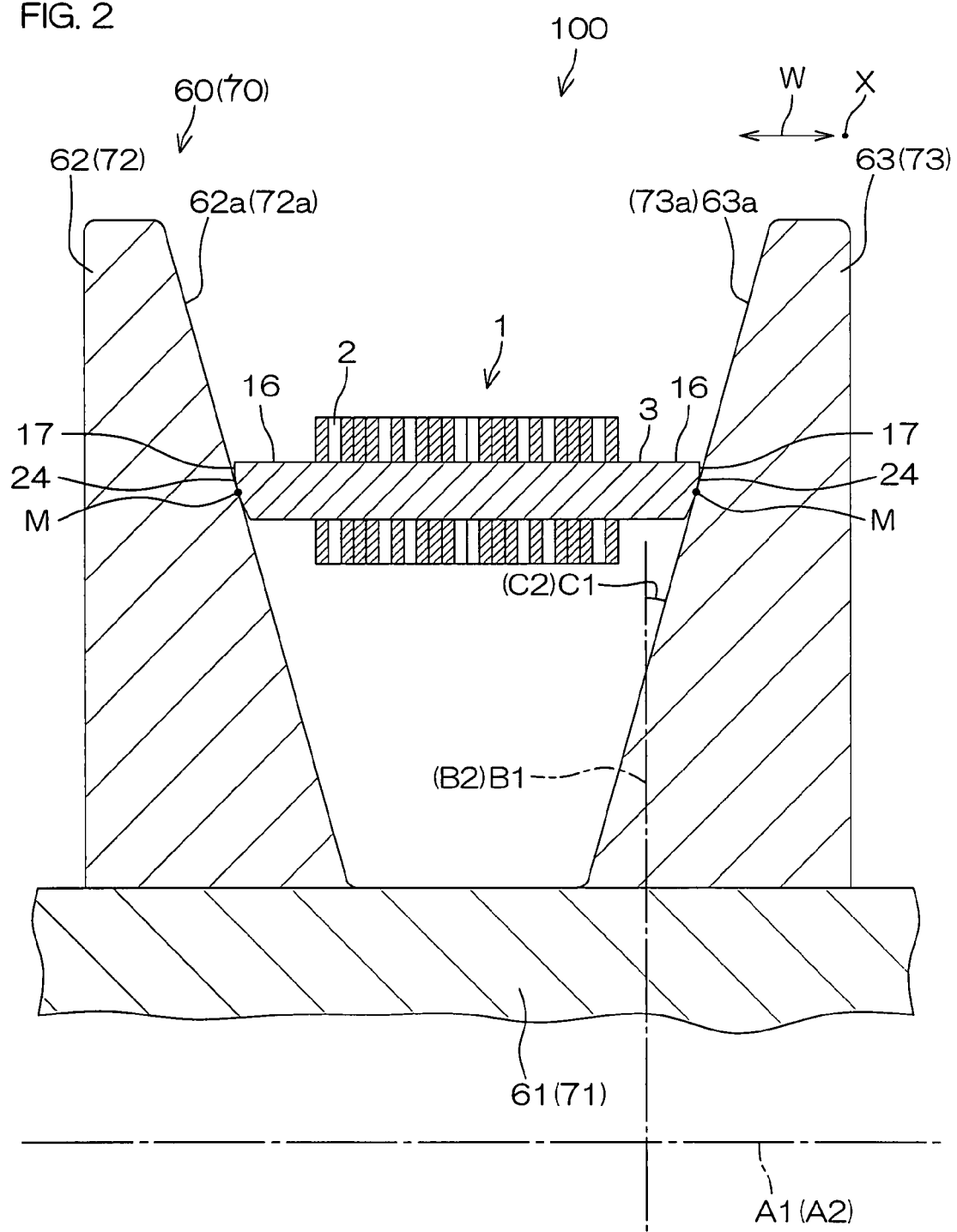
FIG. 2 is a partially enlarged cross section of a drive pulley (driven pulley) and a chain of FIG. 1.

FIG. 2 is a partially enlarged cross section of the drive pulley 60 (driven pulley 70) and the chain 1 of FIG. 1. Referring to FIG. 1 and FIG. 2, the drive pulley 60 is attached to an input shaft 61 linked to the driving source of the vehicle in a power transmitting manner. The drive pulley 60 includes a stationary sheave 62 and a movable sheave 63. The stationary sheave 62 and the movable sheave 63 have a pair of opposing sheave surfaces 62a and 63a, respectively. The sheave surfaces 62a and 63a include inclined planes in the shape of a conical surface.

Each of the sheave surfaces 62a and 63a is inclined with respect to a plane B1 that is orthogonal to a center axis line A1 of the drive pulley 60. An angle (pulley half angle C1) produced between each of the sheave surfaces 62a and 63a and the plane B1 is set to 11°, for example. A groove is defined in between these sheave surfaces 62a and 63a to clamp and hold the chain 1 with high pressure.

A hydraulic actuator (not shown) to change the groove width is connected to the movable sheave 63. It is configured in such a manner that the groove width is changed by moving the movable sheave 63 in the axial direction of the input shaft 61 (transverse direction of FIG. 2) at the time of transmission ratio change. It is therefore possible to change the effective radius for the chain 1 of the drive pulley 60 (equivalent to the winding radius of the chain 1) by moving the chain 1 in the radius direction (vertical direction of FIG. 2) of the input shaft 61.

In FIG. 2, reference numerals of the driven pulley 70 corresponding to their counterparts of the pulley 60 are shown in parentheses. As is shown in FIG. 1 and FIG. 2, the driven pulley 70 is attached to an output shaft 71 linked to the drive wheel (not shown) in a power transmitting manner to be rotatable together. As with the drive pulley 60, the driven pulley 70 includes a stationary sheave 73 and a movable sheave 72. As with the drive pulley 60, the stationary sheave 73 and the movable sheave 72 have a pair of opposing sheave surfaces 73a and 72a, respectively, to define a groove in which the chain 1 is clamped with high pressure.

Each of the sheave surfaces 73a and 72a is inclined with respect to a plane B2 that is orthogonal to a center axis line A2 of the driven pulley 70. An angle (pulley half angle C2) produced between each of the sheave surfaces 73a and 72a and the plane B2 is set to 11°, for example. In other words, the pulley half angle C1 of the drive pulley 60 and the pulley half angle C2 of the driven pulley 70 are made equal (C1=C2).

As with the movable sheave 63 of the drive pulley 60, a hydraulic actuator (not shown) is connected to the movable sheave 72 of the driven pulley 70. It is configured in such a manner that the groove width is changed by moving the movable sheave 72 at the time of transmission ratio change. It is therefore possible to change the effective radius for the chain 1 of the driven pulley 70 (equivalent to the winding radius of the chain 1) by moving the chain 1.

Figure 3:
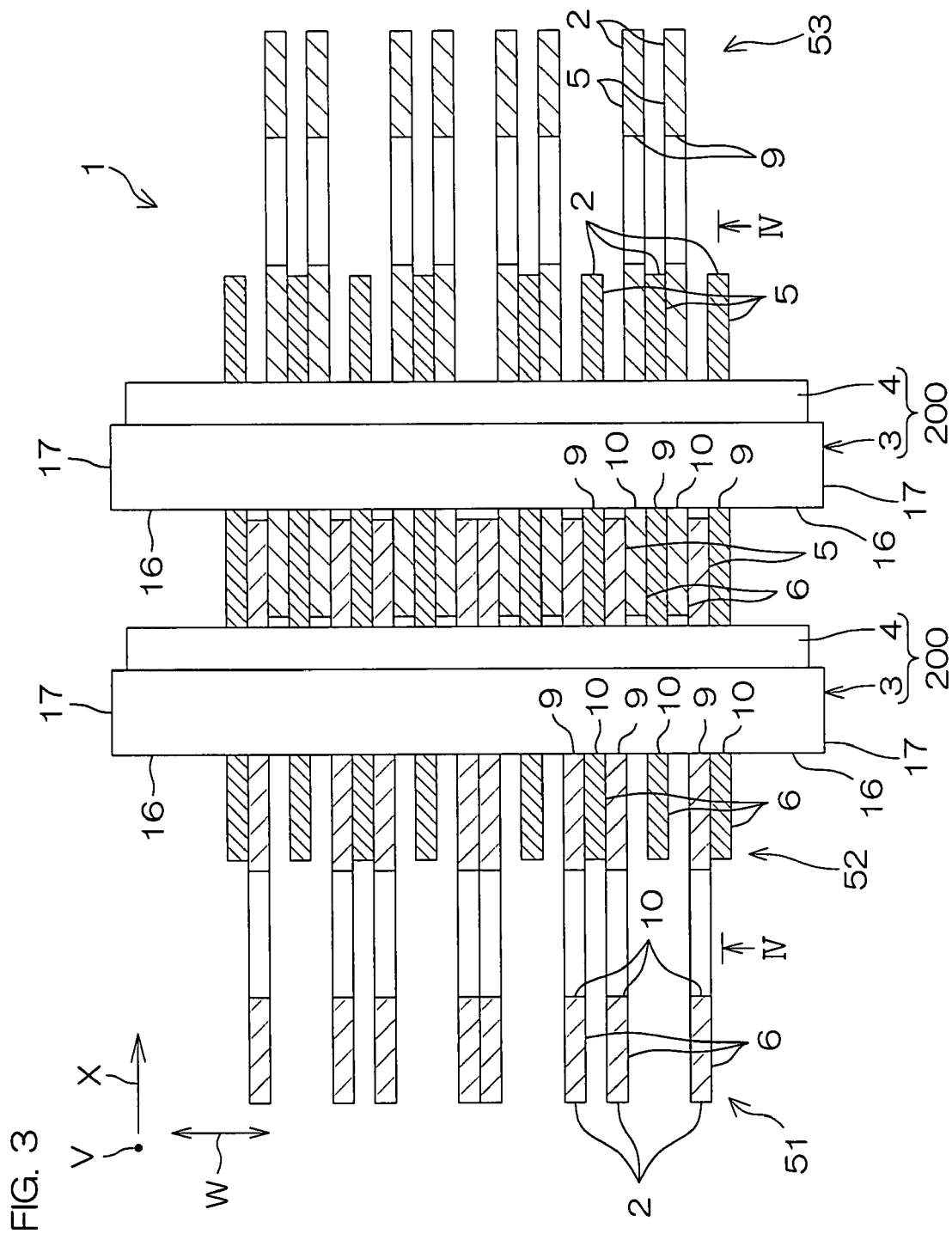
FIG. 3 is a cross section of a major portion of the chain.
Figure 4:
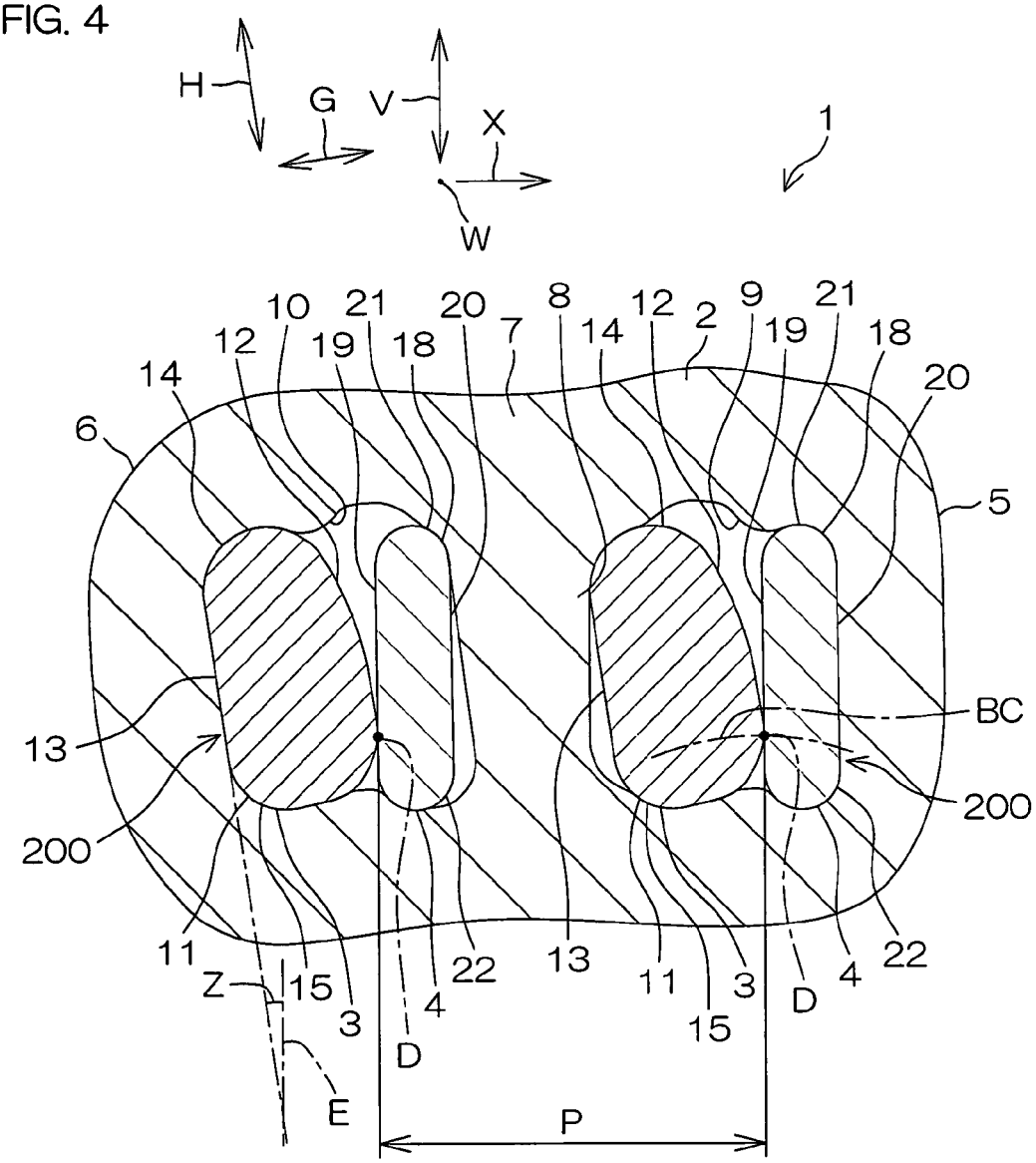
FIG. 4 is a cross section taken on line IV-IV of FIG. 3 showing a chain linear region.

FIG. 3 is a cross section of a major portion of the chain 1. FIG. 4 is a cross section taken on line IV-IV of FIG. 3 showing a chain linear region. Hereinafter, descriptions will be given in reference to the linear region of the chain 1.

Referring to FIG. 3 and FIG. 4, the chain 1 includes links 2 as plural link plates and plural coupling members 200 to couple these links 2 to each other.

Each coupling member 200 includes a first pin 3 serving as a main power transmission member and a second pin 4 serving as an auxiliary power transmission member. In each coupling member 200, the first and second pins 3 and 4 make a pair. The first and second pins 3 and 4 making a pair are configured to come into rolling and sliding contact with each other.

The rolling and sliding contact referred to herein means a contact state including at least one of the rolling contact and the sliding contact.

Hereinafter, a direction along the traveling direction of the chain 1 is referred to as the chain traveling direction X, a direction orthogonal to the chain traveling direction X and along the longitudinal direction of the first and second pins 3 and 4 is referred to as the chain width direction W, and a direction orthogonal to both the chain traveling direction X and the chain width direction W is referred to as the orthogonal direction V.

Each link 2 is shaped like a plate, and includes a front end portion 5 and a rear end portion 6 serving as a pair of end portions aligned in front and rear of the chain traveling direction X, and an intermediate portion 7 disposed between these front end portion 5 and rear end portion 6.

A front through-hole 9 serving as a first through-hole and a rear through-hole 10 serving as a second through-hole are formed in the front end portion 5 and the rear end portion 6, respectively. The intermediate portion 7 has a pillar portion 8 to partition between the front through-hole 9 and the rear through-hole 10. The pillar portion 8 has a predetermined thickness in the chain traveling direction X.

The rim portion of each link 2 is formed in a smooth curve and in a shape such that stress concentration hardly occurs.

First through third rows 51 through 53 are formed using the links 2. To be more concrete, the first row 51, the second row 52, and the third row 53 respectively include plural links 2 that are aligned side-by-side in the chain width direction W. In each of the first through third rows 51 through 53, the links 2 in one row are aligned at the same position in the chain traveling direction X. The first through third rows 51 through 53 are disposed side-by-side along the chain traveling direction X.

The links 2 in the first through third rows 51 through 53 are coupled to the corresponding links 2 in the first through third rows 51 through 53 using the corresponding coupling members 200 to be relatively rotatable (bendable), respectively.

To be more concrete, the front through-hole 9 of the link 2 in the first row 51 and the rear through-hole 10 of the link 2 in the second row 52 are aligned side-by-side in the chain width direction W and correspond to each other. The links 2 in the first and second rows 51 and 52 are coupled to each other with the coupling member 200 inserted through these through-holes 9 and 10 in a bendable manner in the chain traveling direction X.

Likewise, the front through-hole 9 of the link 2 in the second row 52 and the rear through-hole 10 of the link 2 in the third row 53 are aligned side-by-side in the chain width direction W and correspond to each other. The links 2 in the second and third rows 52 and 53 are coupled to each other with the coupling member 200 inserted through these through-holes 9 and 10 in a bendable manner in the chain traveling direction X.

In FIG. 3, although only a single row is shown for each of the first through third rows 51 through 53, the first through third rows 51 through 53 are disposed repetitively along the chain traveling direction X. The links 2 in two rows adjacent to each other in the chain traveling direction X are coupled to each other successively with the corresponding coupling members 200, thereby forming the endless chain 1.

Referring to FIG. 3 and FIG. 4, the first pin 3 is an elongated (plate-shaped) power transmission member extending in the chain width direction W. The circumferential surface 11 of the first pin 3 extends in parallel with the chain width direction W.

The circumferential surface 11 has a front portion 12 serving as a counter portion facing forward in the chain traveling direction X, a rear portion 13 serving as a back portion facing backward in the chain traveling direction X, and a one end portion 14 and the other end portion 15 as a pair of end portions that oppose each other in the orthogonal direction V.

The front portion 12 has a sectional shape formed in a smooth curve, and comes into rolling and sliding contact with a second pin 4 as the counterpart of a pair at a contact portion D. In the cross section of the front portion 12, a portion positioned on the chain's outer diameter side from the contact portion D in the linear region of the chain 1 is formed as a rate-of-change increasing portion in which a rate of change of an displacement amount at the contact portion D is increased according to an increase of the angle of bend between the links 2. To be more concrete, this portion is formed in an involute curve as a predetermined curve. The involute curve of the cross section is based on a predetermined base circle BC having its center disposed at a position on the inner side in chain's diameter direction from the front portion 12 when viewed in the chain width direction W.

The rear portion 13 is formed to have a flat surface. This flat surface has a predetermined angle of inclination Z with respect to a predetermined plane E orthogonal to the chain traveling direction X (in FIG. 4, a plane perpendicular to the sheet surface). The rear portion 13 is inclined in a counter-clockwise direction of the drawing with respect to the plane E and faces toward the inner side in chain's diameter direction.

The one end portion 14 forms an end portion of the circumferential surface 11 of the first pin 3 on the outer side in chain's diameter direction (one side in the orthogonal direction V), and is formed in a curved surface that is curved convexly toward the outer side in chain's diameter direction.

The other end portion 15 forms an end portion of the circumferential surface 11 of the first pin 3 on the inner side in chain's diameter direction (the other side in the orthogonal direction V), and is formed in a curved surface that is curved convexly toward the inner side in chain's diameter direction.

The first pin 3 has a predetermined thickness in the thickness direction G along a direction orthogonal to the rear portion 13. It also has a predetermined height in the height direction H parallel to the rear portion 13 when viewed in the chain width direction W.

A pair of end portions 16 of the first pin 3 that oppose each other in the longitudinal direction of the first pin 3 (the chain width direction W) protrudes in the chain width direction W from the links 2 disposed at a pair of the end portions in the chain width direction W.

The pair of the end portions 16 is provided with a pair of opposing end faces 17 serving as power transmission surfaces. The pair of the end surfaces 17 has a symmetric shape with respect to each other with a plane orthogonal to the chain width direction W in between. These end faces 17 are provided to come into frictional contact with the corresponding sheave surfaces 62a, 63a, 72a and 73b of the respective pulleys 60 and 70 (see FIG. 2).

The first pin 3 is pinched between the corresponding sheave surfaces 62a, 63a, 72a, and 73a, so that power is transmitted between the first pin 3 and the respective pulleys 60 and 70. Because the end faces 17 of the first pin 3 directly contribute to power transmission, the pin is made of a high-strength wear-proof material, for example, bearing steel (SUJ2).

Figure 5:
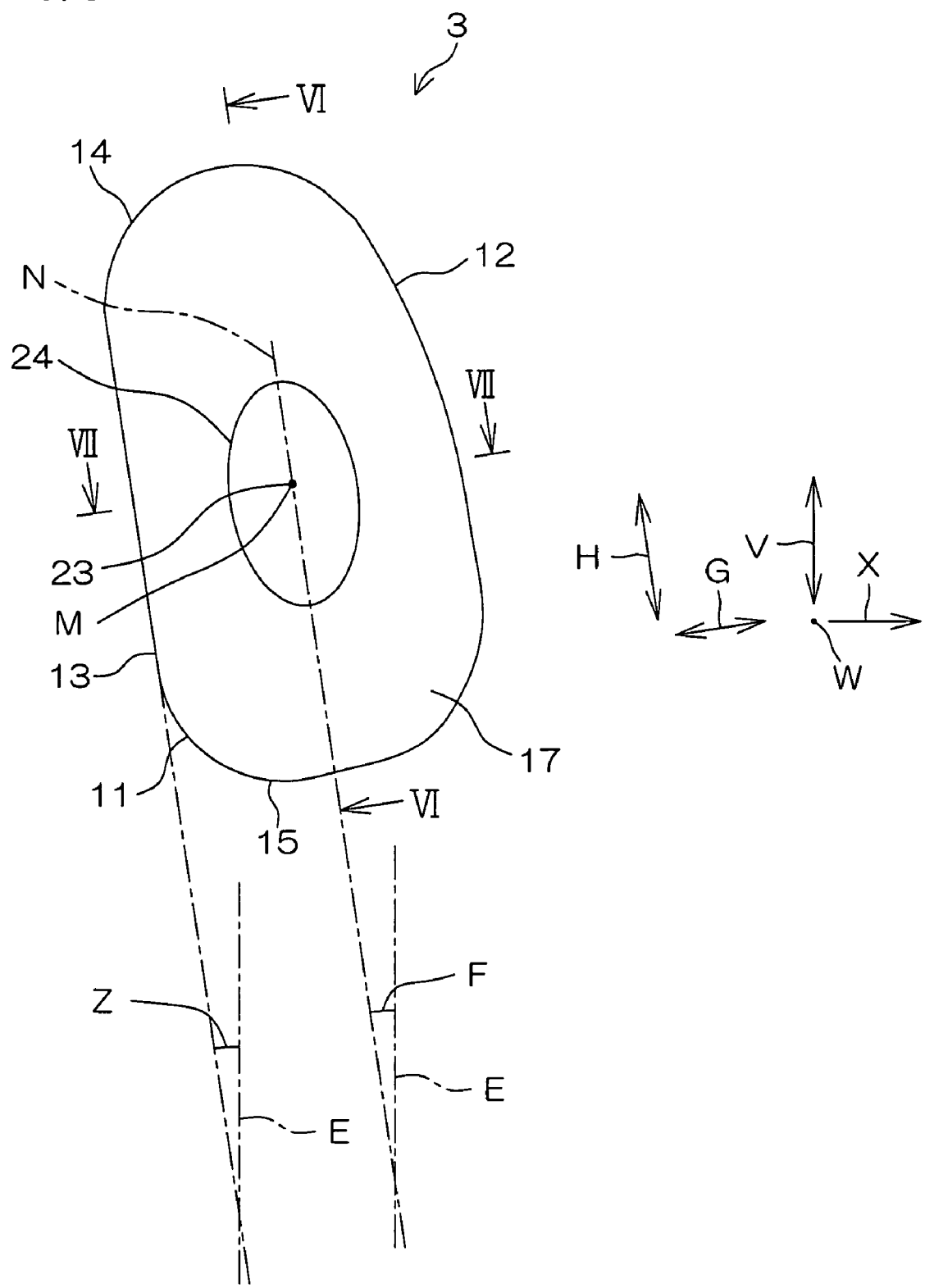
FIG. 5 is a view of a first pin when viewed in a chain width direction W.

FIG. 5 is a view of the first pin 3 when viewed in the chain width direction W. FIG. 6 is a cross section taken on line VI-VI of FIG. 5, which is a cross section parallel to the rear portion 13 generally at the center portion of the first pin 3 in the thickness direction G. FIG. 7 is a cross section taken on line VII-VII of FIG. 5, which is across section orthogonal to the rear portion 13 generally at the center portion of the first pin 3 in the height direction H.

Referring to FIG. 5 through FIG. 7, each end face 17 of the first pin 3 is formed in a shape including part of a spherical surface, and is curved convexly toward the outside in the chain width direction W. The end face 17 has a predetermined radius of curvature R and faces toward the inner side in chain's diameter direction.

The predetermined radius of curvature R is set in a range of 40 mm to 200 mm, for example (40≦R≦200; 150 mm in this embodiment, for example). The end face 17 therefore has a radius curvature in each of the thickness direction G and the height direction H as two directions that cross each other.

In comparison with the other end portion 15, the one end portion 14 of the first pin 3 is formed long (wide) in the chain width direction W. As is shown in FIG. 6, when viewed from the cross section parallel to the rear portion 13, a first straight line K1 linking an apical portion 23 (apex) of the end face 17 and the center point of curvature J of the end face 17, and a second straight line K2 passing the apical portion 23 of the end face 17 and extending in the chain width direction W cross each other at a predetermined angle L. The angle L is equal to the pulley half angle C1 (C2) shown in FIG. 2 (L=C1=C2).

Referring to FIG. 5 and FIG. 6 again, the end face 17 is provided with a contact region 24. In the end face 17, the contact region 24 thereof is adopted to contact with the corresponding sheave surfaces of the pulleys, respectively.

The contact region 24 is of an elliptical shape, for example when viewed in the chain width direction W, and has a center point of contact M (equivalent to the center of figure of the contact region 24). The center point of contact M coincides with the apical portion 23 of the end face 17. A distance DM between a pair of the center points of contact M is constant in each of the first pins 3.

When viewed along the chain width direction W, the major axis N serving as a predetermined portion in the contact region 24 has a predetermined angle of attack F (for example, 5 to 12°; 10° in this embodiment) with respect to the aforementioned plane E orthogonal to the chain traveling direction X. In other words, the major axis N is inclined with respect to the plane E by 10° in a counterclockwise direction of the drawing. The major axis N moves toward the chain traveling direction X as it is headed from outer side to inner side in the chain's diameter direction.

The angle of attack F is made equal, for example, to the angle of inclination Z of the rear portion 13 of the first pin 3 (F=Z).

As has been described above, the end face 17 is formed in a shape including part of a spherical surface. The contact region 24 therefore has a radius of curvature in each of the thickness direction G and the height direction H.

Referring to FIG. 3 and FIG. 4, the second pin 4 (referred to also as a strip or an interpiece) is a long (plate-shaped) counter member made of the same material as the first pin 3 and extending in the chain width direction W. The second pin 4 is a member interposed between the corresponding link 2 and the first pin 3 as the counterpart of a pair.

The second pin 4 is formed shorter than the first pin 3 in the chain width direction W so as not to come into contact with the sheave surfaces of each of the pulleys. The second pin 4 is disposed in front of the first pin 3 as the counterpart of a pair in the chain traveling direction X. The second pin 4 is formed thinner than the first pin 3 in the chain traveling direction X.

The circumferential surface 18 of the second pin 4 extends in the chain width direction W. The circumferential surface 18 has a rear portion 19 facing backward in the chain traveling direction X, a front portion 20 facing forward in the chain traveling direction X, and a one end portion 21 and the other end portion 22 as a pair of end portions in the orthogonal direction V.

The rear portion 19 is formed to have a flat surface orthogonal to the chain traveling direction X. The rear portion 19 opposes the front portion 12 of the first pin 3 as the counterpart of a pair, and is configured to come into rolling and sliding contact with the front portion 12 at the contact portion D in association with the bending of the links 2.

The front portion 20 is formed to have a flat surface extending generally in parallel with the rear portion 19.

The one end portion 21 forms an end portion in the circumferential surface 18 of the second pin 4 on outer side in the chain's diameter direction, and is formed in a curved surface that is curved convexly toward outer side in the chain's diameter direction.

The other end portion 22 forms an end portion in the circumferential surface 18 of the second pin 4 on inner side in the chain's diameter direction, and is formed in a curved surface that is curved convexly toward inner side in the chain's diameter direction.

According to the configuration described above, the trajectory of the contact portion D in reference to the first pin 3 generally forms an involute curve when viewed in the chain width direction W.

The chain 1 is a chain of a so-called press-fitting type. To be more concrete, the first pin 3 is loose fit into the front through-hole 9 of each link 2 so as to be relatively movable while being press-fit into the rear through-hole 10 of each link 2 so as to be inhibited from moving relatively. The second pin 4 is press-fit into the front through-hole 9 of each link 2 so as to be inhibited from moving relatively while being loosely fit into the rear through-hole 10 of each link 2 so as to be relatively movable.

In other words, into the front through-hole 9 of each link 2 is loose fit the first pin 3 to be relatively movable while the second pin 4 making a pair with the first pin 3 is press-fit so as to be inhibited from moving relatively, and into the rear through-hole 10 of each link 2 is press-fit the first pin 3 so as to be inhibited from moving relatively while the second pin 4 making a pair with the first pin 3 is loose fit so as to be relatively movable.

According to the configuration described above, when the links 2 adjacent to each other in the chain traveling direction X bend with respect to each other, that is, when the chain 1 is bent, the corresponding first pin 3 comes into rolling and sliding contact with the second pin 4 as the counterpart of a pair on the contact portion D that undergoes displacement.

In addition, the chain 1 has a predetermined coupling pitch P. The coupling pitch P is defined as a pitch between the first pins 3 adjacent to each other in the chain traveling direction X in the linear region of the chain 1. To be more concrete, it is defined as a distance in the chain traveling direction X between the contact portion D of the first and second pins 3 and 4 within the front through-hole 9 of the link 2 and the contact portion D of the first and second pins 3 and 4 within the rear through-hole 10 of the same link 2 in the linear region of the chain 1. In this embodiment, the coupling pitch P is set to 8 mm, for example.

Figure 8:
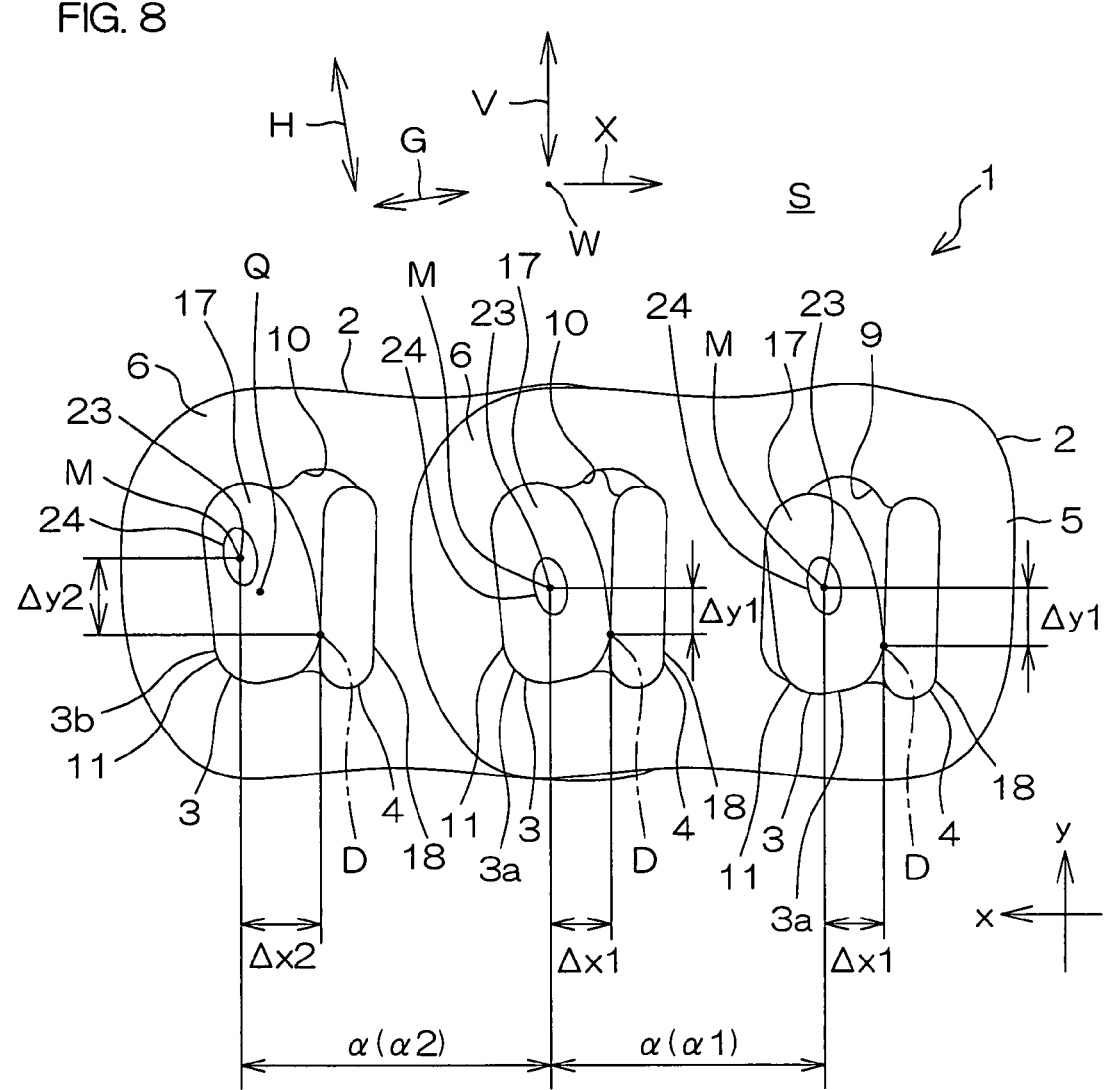
FIG. 8 is a view of a major portion of the chain when viewed in the chain width direction.

FIG. 8 is a view of a major portion of the chain 1 when viewed in the chain width direction W. Descriptions with reference to FIG. 8 are given in a state where the linear region of the chain 1 is viewed in the chain width direction W.

Referring to FIG. 8, this embodiment is characterized in that the first pin 3 includes a first type pin 3a and a second type pin 3b serving as plural types of power transmission members, and these first type pins 3a and second type pins 3b are arranged randomly in the chain traveling direction X.

The phrase, "the first type pins 3a and the second type pins 3b are arranged randomly in the chain traveling direction X", means that at least one of the first type pins 3a and the second type pins 3b are disposed irregularly at least in part in the chain traveling direction X. The term, "irregularly", means that at least one of the periodicity and the regularity is absent.

When the linear region of the chain 1 is viewed in the chain width direction W, the relative position of the contact portion D of the first type pin 3a and the center point of contact M and the relative position of the contact portions D of the second type pin 3b and the center point of contact M are different from each other.

To be more concrete, the apical portion 23 of each end face 17 of the first type pin 3a generally coincides with the center of figure of the end face 17. In other words, the center point of contact M of the contact region 24 in the end face 17 of the first type pin 3a generally coincides with the center of figure of the end face 17. The center point of contact M is positioned generally at the center portion of the first pin 3 in each of the height direction H and the thickness direction G.

The apical portion 23 of the end face 17 of the second type pin 3b is disposed at an offset position with respect to the center of figure Q of the end face 17. In other words, the center point of contact M of the contact region 24 in each end face 17 of the second type pin 3b is disposed at an offset position with respect to the center of figure Q of the end face 17.

When viewed in the chain width direction W, the center point of contact M of the end face 17 of the second type pin 3b is disposed apart from the center of figure Q of the end face 17 at least in one of the chain traveling direction X and the orthogonal direction V (both in this embodiment).

The relative position of the center point of contact M of each end face 17 of the first type pin 3a and the center point of curvature of the end face 17 of the first type pin 3a, and the relative position of the center point of contact M of each end face 17 of the second type pin 3b and the center point of curvature of the end face 17 of the second type pin 3b are different from each other at least in one of the chain traveling direction X, the chain width direction W, and the orthogonal direction V.

According to the configuration described above, when the linear region of the chain 1 is viewed in the chain width direction W, the relative position of the center point of contact M with respect to the contact portion D of the first type pin 3a, and the relative position of the center point of contact M with respect to the contact portion D of the second type pin 3b are different from each other at least in one of the chain traveling direction X and the orthogonal direction V (both in this embodiment).

Accordingly, when the linear region of the chain 1 is viewed in the chain width direction W, plural distances are provided as a distance (pitch α between the center points of contact) between the first pins 3 adjacent to each other in the chain traveling direction X in reference to the center point of contact M of the end face 17 of the first pin 3.

To be more concrete, there are two pitches including a pitch α1 between the center points of contact formed when the first type pins 3a or the second type pins 3b are adjacent to each other in the chain traveling direction X, and a pitch α2 between the center points of contact formed when the first type pin 3a and the second type pin 3b are adjacent to each other in the chain traveling direction X.

The first type pins 3a and the second type pins 3b are arranged randomly in the chain traveling direction X. Accordingly, the pitch α1 between the center points of contact and the pitch α2 between the center points of contact are arranged randomly in the chain traveling direction X.

The phrase, "the pitch α1 between the center points of contact and the pitch α2 between the center points of contact are arranged randomly in the chain traveling direction X", means that at least one of the pitch α1 between the center points of contact and the pitch α2 between the center points of contact is arranged irregularly at least in part in the chain traveling direction X.

A distance between the apical portions 23 (the center points of contact M) of a pair of the end faces 17 of the first type pin 3a and a distance between the apical portions (the center points of contact, M) of a pair of the end faces 17 of the second type pin 3b in the chain width direction W are equal to each other.

A projection plane S orthogonal to the chain width direction W is provided with a 2-dimensional relative coordinate system having an x-axis extending along a direction opposite to the chain traveling direction X and a y-axis extending along the orthogonal direction V. When the contact portion D and the center point of contact M of the first type pin 3a are projected onto the projection plane S, the coordinate of projected point of the center point of contact M having a projected point of contact portion D as the origin (hereinafter, referred to simply as the coordinate of the projected point of the center point of contact M of the first type pin 3a) is regarded as ($\Delta x1$, $\Delta y1$), for example. In other words, the center point of contact M is spaced apart from the contact portion D of the first type pin 3a by $\Delta x1$ in the x-axis direction and by $\Delta y1$ in the y-axis direction.

Likewise, when the contact portion D and the center point of contact M of the second type pin 3b are projected onto the projection plane S, the coordinate of projected point of the center point of contact M having a projected point of contact portion D as the origin (hereinafter, referred to simply as the coordinate of the projected point of the center point of contact M of the second type pin 3b) is regarded as ($\Delta x2$, $\Delta y2$), for example. In other words, the center point of contact M is spaced apart from the contact portion D of the second type pin 3b by $\Delta x2$ in the x-axis direction and by $\Delta y2$ in the y-axis direction.

As has been described, the two coordinate components of the coordinate of the projected point of the center point of contact M of the first type pin 3a are different from at least one of the corresponding coordinate components of the coordinate of the projected point of the center point of contact M of the second type pin 3b (both in this embodiment).

It is preferable that the components $\Delta x1$ and $\Delta x2$ fall within a range of 0 mm to 2.0 mm ($0 \leq \Delta x1 \leq 2.0$ and $0 \leq \Delta x2 \leq 2.0$), respectively.

It is physically impossible to set the value of each of the components $\Delta x1$ and $\Delta x2$ to less than 0 mm, that is, a negative value, because it results that each center point of contact M is positioned in front of the corresponding contact portion D in the chain traveling direction X. Further, when the value of each of the components $\Delta x1$ and $\Delta x2$ exceeds 2 mm, a relative collision speed with the respective pulleys 60 and 70 becomes higher as the center of the pin shifts backward, which gives rise to stronger vibrations and larger noises. Accordingly, the respective components Δx1 and Δx2 are set to fall within the range specified above, respectively.

Further, it is preferable that the components Δy1 and Δy2 fall within a range of 0.5 mm to 2.4 mm (0.5≦Δy1≦2.4 and 0.5≦Δy2≦2.4), respectively.

Although it depends on the size, a case where the value of each of the components Δy1 and Δy2 is less than 0.5 mm is not preferable, because while brought the first pin 3 into contact with the respective pulleys 60 and 70, the coupling pitch becomes smaller than the coupling pitch in the straight line state. Further, when the value of each of the components Δy1 and Δy2 exceeds 2.4 mm, the coupling pitch while brought the first pin 3 into contact with the respective pulleys 60 and 70 becomes excessive. Accordingly, the respective components Δy1 and Δy2 are set to fall within the range specified above, respectively.

Further, it is preferable that an absolute value of a difference between the component Δx1 and the component Δx2, |Δx1−Δx2|, falls within a range of 0.1 mm to 1.0 mm (0.1≦|Δx1−Δx2|≦1.0).

When the absolute value of a difference, |Δx1−Δx2|, is less than 0.1 mm, even when the first type pins 3a and the second type pins 3b are disposed randomly, dispersion of the peak at the n-order of mesh is so small that the noise reducing effect is smaller. When the absolute value of a difference, |Δx1−Δx2|, is greater than 1.0 mm, a range of the contact region 24 in the end face 17 of the first pin 3 falls outside a normal range. Accordingly, the absolute value of a difference, |Δx1−Δx2|, is set to fall within the range specified as above.

Further, it is preferable that the absolute value of a difference between the components Δy1 and Δy2, |Δy1−Δy2|, falls within a range of 0.1 mm to 0.5 mm (0.1≦|Δy1−Δy2|≦0.5).

When the absolute value of a difference, |Δy1−Δy2|, is less than 0.1 mm, the peak dispersing effect at the first order of mesh is small. Furthermore, when the absolute value of a difference, |Δy1−Δy2|, is greater than 0.5 mm, contact between the first pins 3 and the respective pulleys 60 and 70 in a normal order is inhibited when the bending radius of the chain 1 becomes large. Accordingly, the absolute value of a difference, |Δy1−Δy2|, is set to fall within the range specified above.

The schematic configuration of the CVT 100 is as described above. Referring to FIG. 1 and FIG. 8, in the CVT 100, the chain 1 is driven to rotate when the drive pulley 60 is rotated in association with the rotational driving of the input shaft 61, so that the first type pins 3a and the second types pin 3b are successively meshed with the respective pulleys 60 and 70.

According to this embodiment, when the linear region of the chain 1 is viewed in the chain width direction W, the relative position of the contact portion D and the center point of contact M of the first type pin 3a, and the relative position of the contact portion D and the center point of contact M of the second type pin 3b are made different from each other.

Accordingly, timing at which the respective first pins 3 are successively meshed with the respective pulleys 60 and 70 is made different, which can randomize the cycles of mesh. In other words, the cycles of mesh sounds can be randomized when the respective first pins 3 are successively meshed with the pulleys 60 and 70, respectively. It is therefore possible to prevent the peak from being generated at a predetermined frequency by distributing the frequency of the mesh sounds over a broad range and reduce noises associated with the driving of the chain 1.

In addition, the two coordinate components (Δx1, Δy1) of the coordinate of the projected point of the center point of contact M of the first type pin 3a are made different from at least one of the corresponding two coordinate components (Δx2, Δy2) of the coordinate of the projected point of the center point of contact M of the second type pin 3b (different from both of Δx2 and Δy2 in this embodiment). As has been described, it is possible to achieve the noise reducing effect in a reliable manner with the configuration as simple as differentiating the projected point of the center point of contact M with respect to the projected point of the contact portion D of the first type pin 3a and the position of the projected point of the center point of contact M with respect to the projected point of the contact portion D of the second type pin 3b from each other.

Further, the contact region 24 of each first pin 3 has a curvature in each of the thickness direction G and the height direction H as the two directions that cross each other. Accordingly, each contact region 24 is allowed to smoothly come into contact with the corresponding sheave surfaces 62a, 63a, 72a and 73b of the respective pulleys 60 and 70 to further reduce noises while the chain 1 is driven.

In addition, providing the angle of attack F to the first pin 3 optimizes the arrangement of the first pins 3 to smooth further the engagement with each of the pulleys 60 and 70.

Furthermore, the first pin 3 is loose fit into the front through-hole 9 of each link 2 while it is press-fit into the rear through-hole 10 of each link 2, and the second pin 4 is press-fit into the front through-hole 9 of each link 2 while it is loose fit into the rear through-hole 10 of each link 2.

Accordingly, when the end faces 17 of each first pin 3 come into contact with the corresponding sheave surfaces 62a, 63a, 72a, and 73a of the respective pulleys 60 and 70, the second pin 4 as the counterpart of a pair comes into rolling and sliding contact with the first pin 3 to allow the links 2 to bend with respect to each other.

In this instance, between the first and second pins 3 and 4 making a pair, the rolling contact components with respect to each other are large whereas the sliding contact components are extremely small, which consequently allows the end faces 17 of each first pin 3 to come into contact with the respective sheave surfaces 62a, 63a, 72a, and 73a while being hardly rotated. It is thus possible to ensure a high transmission efficiency by reducing a frictional loss.

Further, because the trajectory of the contact portion D of the first and second pins 3 and 4 making a pair forms a generally involute shape, it is possible to suppress the occurrence of a chordal action to the chain 1 when the respective first pins 3 are successively meshed with the respective pulleys 60 and 70. Consequently, noises made while the chain 1 is driven can be further reduced.

As has been described, it is possible to achieve the CVT 100 excellent in power transmission efficiency and quietness.

Figure 9A:
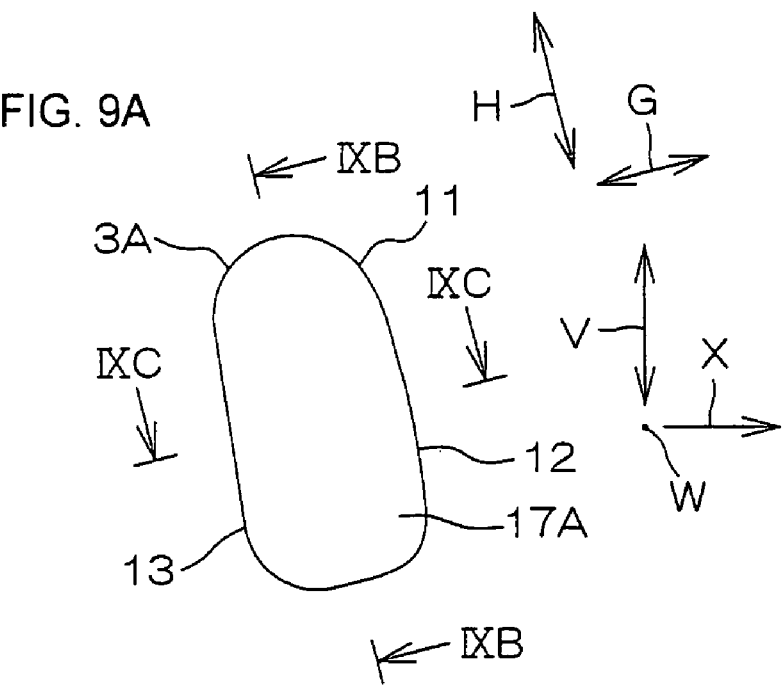
FIG. 9A is a view for showing another embodiment of the invention, which is a side view of the first pin when viewed in the chain width direction.
Figure 9B:
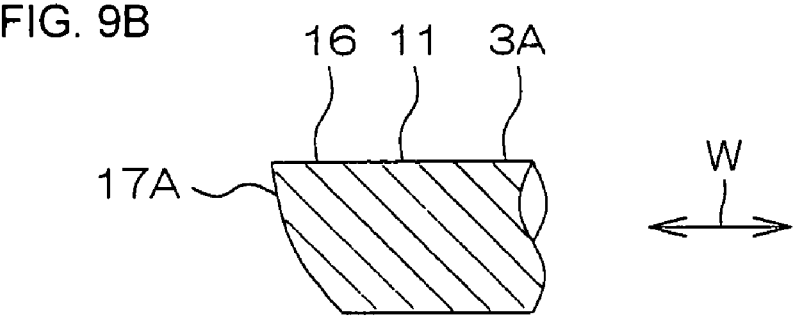
FIG. 9B is a cross section taken on line IXB-IXB of FIG. 9(A) that is parallel to the rear portion of the first pin.
Figure 9C:
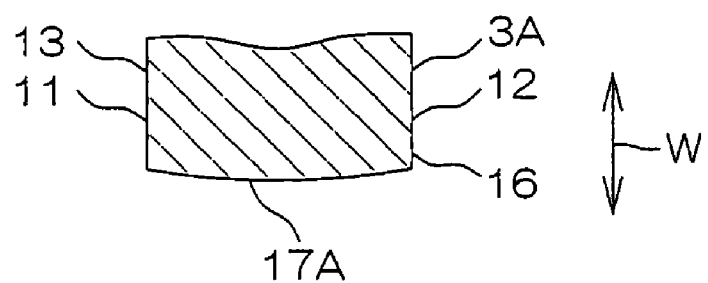
FIG. 9C is a cross section taken on line IXC-IXC of FIG. 9(A) that is orthogonal to the rear portion of the first pin.

FIG. 9 is a view for showing another embodiment of the invention. FIG. 9(A) is a side view of a first pin 3A when viewed in the chain width direction W. FIG. 9(B) is a cross section taken on line IXB-IXB of FIG. 9(A) that s parallel to the rear portion 13 of the first pin 3A. FIG. 9(C) is a cross section taken on line IXC-IXC of FIG. 9(A) that is orthogonal to the rear portion 13 of the first pin 3A.

In this embodiment, differences from the embodiment shown in FIG. 1 through FIG. 8 will be chiefly described. Similar components are labeled with similar reference numerals and descriptions of these components are omitted herein.

Referring to FIG. 9(A) through 9(C), this embodiment is characterized in that a crowning process (double crowning process) is applied to each end face 17A of the first pin 3A in two directions that cross each other when viewed in the chain width direction W.

To be more concrete, the crowning process is applied to each end face 17A of the first pin 3A in each of the thickness direction G and the height direction H when viewed in the chain width direction W.

In other words, as is shown in FIG. 9(B), the shape of the cross section of the end face 17A of the first pin 3A that is parallel to the rear portion 13 is of a shape subjected to the crowning process. This shape is formed in a shape to protrude convexly outward in the chain width direction W. The shape may have a constant radius of curvature or it may have plural radii of curvature.

Further, as is shown in FIG. 9(C), the shape of the cross section of the end face 17A of the first pin 3A that is orthogonal to the rear portion 13 is of a shape subjected to the crowning process. This shape is formed in a shape to protrude convexly outward in the chain width direction W at the intermediate portion. This shape may have a constant radius of curvature or it may have plural radii of curvature.

Figure 10A:
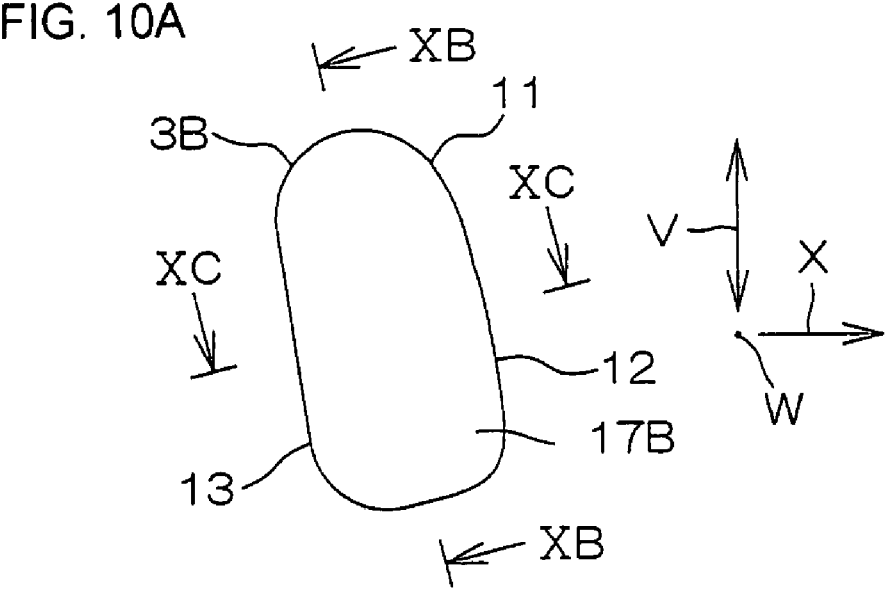
FIG. 10A is a view for showing still another embodiment of the invention, which is a side view of the first pin when viewed in the chain width direction.
Figure 10B:
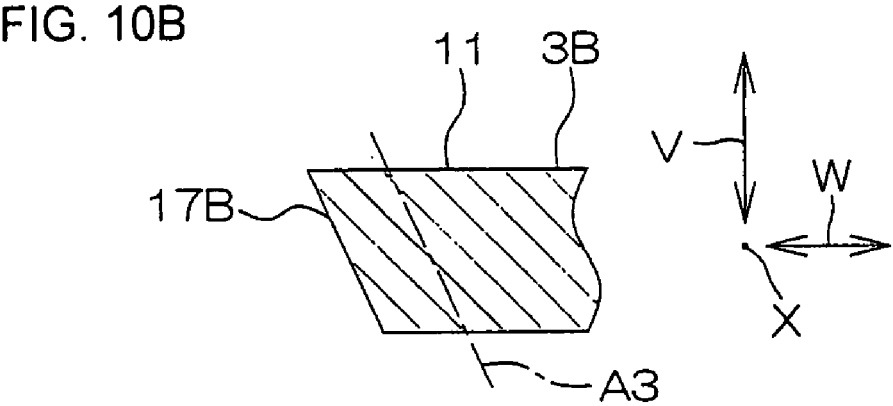
FIG. 10B is a cross section taken on line XB-XB of FIG. 10(A) that is parallel to the rear portion of the first pin.
Figure 10C:
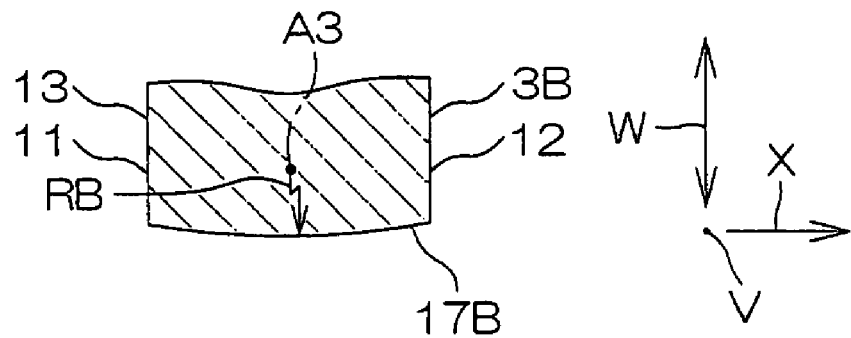
FIG. 10C is a cross section taken on line XC-XC of FIG. 10(A) that is orthogonal to the rear portion of the first pin.

FIG. 10 is a view for showing still another embodiment of the invention. FIG. 10(A) is a side view of a first pin 3B when viewed in the chain width direction W. FIG. 10(B) is a cross section taken on line XB-XB of FIG. 10(A) that is parallel to the rear portion 13 of the first pin 3B. FIG. 10(C) is a cross section taken on line XC-XC of FIG. 10(A) that is orthogonal to the rear portion 13 of the first pin 3B.

In this embodiment, differences from the embodiment shown in FIG. 1 through FIG. 8 will be chiefly described. Similar components are labeled with similar reference numerals and descriptions of these components are omitted herein.

Referring to FIG. 10(A) through 10(C), this embodiment is characterized in that the end faces 17B of each first pin 3B are formed in a shape comprising part of a cylindrical surface. To be more concrete, each end face 17B has a predetermined radius of curvature RB (for example, 150 mm) in the cross section orthogonal to the rear portion 13.

Further, the end face 17B is formed in a linear shape in the cross section parallel to the rear portion 13 of the first pin 3B. The length between a pair of the end faces 17B of the first pin 3B in the chain width direction W becomes shorter toward as it is headed to the inner side in the chain's diameter direction.

The cylindrical surface of the end face 17B has a center line axis A3. As shown in FIG. 10(B), the center axis line A3 is inclined to move to the inner side in the chain width direction W as it is headed to the inner side in chain's diameter direction from the outer side in chain's diameter direction. This inclination varies in each type of the first pin.

Figure 11A:
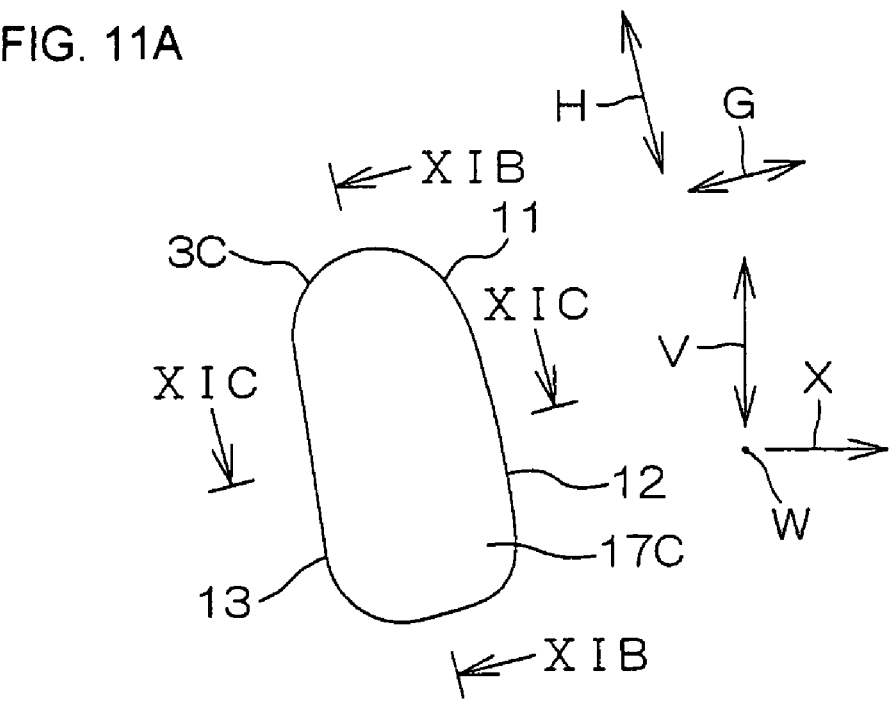
FIG. 11A is a view for showing still another embodiment of the invention, which is a side view of the first pin when viewed in the chain width direction.
Figure 11B:
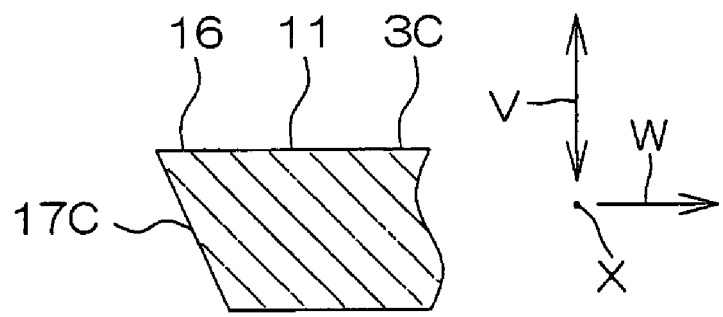
FIG. 11B is a cross section taken on line XIB-XIB of FIG. 11(A) that is parallel to the rear portion of the first pin.
Figure 11C:
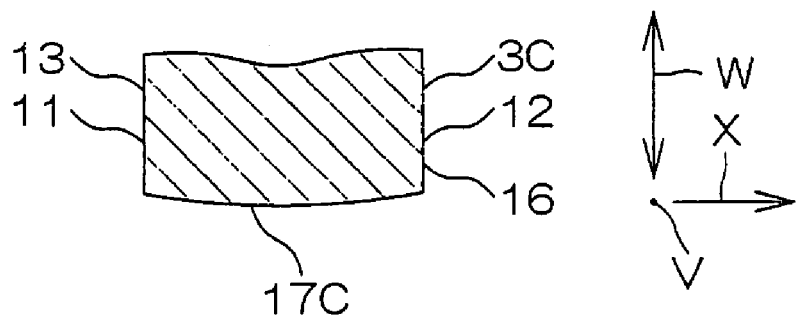
FIG. 11C is a cross section taken on line XIC-XIC of FIG. 11(A) that is orthogonal to the rear portion of the first pin.

FIG. 11 is a view for showing still another embodiment of the invention. FIG. 11(A) is a side view of a first pin 3C when viewed in the chain width direction W. FIG. 11(B) is a cross section taken on line XIB-XIB of FIG. 11(A) that is parallel to the rear portion 13 of the first pin 3C. FIG. 11(C) is a cross section taken on line XIC-XIC of FIG. 11(A) that is orthogonal to the rear portion 13 of the first pin 3C.

In this embodiment, differences from the embodiment shown in FIG. 1 through FIG. 8 will be chiefly described. Similar components are labeled with similar reference numerals and descriptions of these components are omitted herein.

Referring to FIG. 11(A) through FIG. 11(C), this embodiment is characterized in that the end faces 17C of the first pin 3C are formed in a cylindrical shape as the result of the crowning process (single crowning process) applied in one direction when viewed in the chain width direction W.

To be more concrete, the crowning process is applied to the end faces 17C of the first pin 3C in a direction orthogonal to the rear portion 13 when viewed in the chain width direction W.

In other words, as is shown in FIG. 11(C), the shape of the cross section of each end face 17C of the first pin 3C that is orthogonal to the rear portion 13 is of a shape subjected to the crowning process. This shape is formed in a shape to protrude convexly outward in the chain width direction W at the intermediate portion. This shape may have a constant radius of curvature or it may have plural radii of curvature.

Further, as is shown in FIG. 11(B), the shape of the cross section of each end face 17C of the first pin 3C that is parallel to the rear portion 13 is formed in a linear shape. A distance between a pair of the end faces 17C of the first pin 3C in the chain width direction W becomes shorter as it is headed to the inner side in the chain's diameter direction.

12 is a partial cross section of a major portion according to still another embodiment of the invention. In this embodiment, differences from the embodiment shown in FIG. 1 through FIG. 8 will be chiefly described. Similar components are labeled with similar reference numerals and descriptions of these components are omitted herein.

Figure 12:
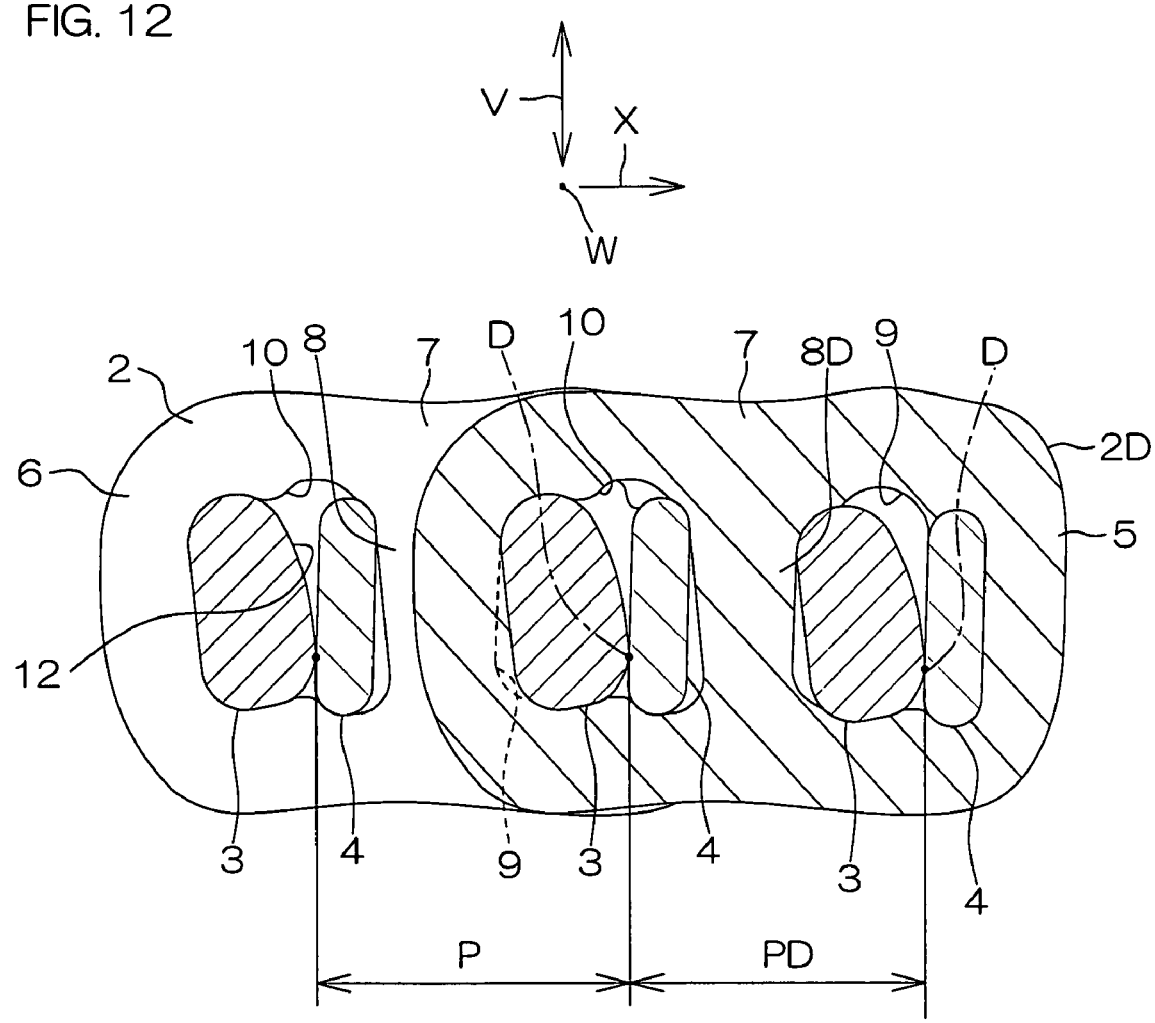
FIG. 12 is a partial cross section of a major portion according to still another embodiment of the invention.

Referring to FIG. 12, this embodiment is characterized in that contact cycles in which the respective first pins successively come into contact with (engage with) the corresponding sheave surfaces of the respective pulleys are randomized.

To be more concrete, links 2 as links having a relatively long coupling pitch and links 2D as links having a relatively short coupling pitch are provided as plural types of the links each having a different coupling pitch.

The thickness of the pillar portion 8D of the link 2D in the chain traveling direction X is made thinner than the thickness of the pillar portion 8 of the link 2 in the chain traveling direction X. Accordingly, the coupling pitch PD of the links 2D is made shorter than the coupling pitch P of the links 2 (PD<P).

The links 2 and the links 2D (a link row including the links 2 and a link row including the links 2D) are arranged randomly in the chain traveling direction X.

The phrase, "arranged randomly", in this case means that at least one of the links 2 and the links 2D are disposed irregularly at least in part in the chain traveling direction X.

According to this embodiment, it is possible to distribute the frequency of mesh sounds over a broad range by further randomizing the cycles of mesh sounds made when the respective first pins 3 are successively meshed with the respective pulleys to further reduce the noises during the driving.

Figure 13A:
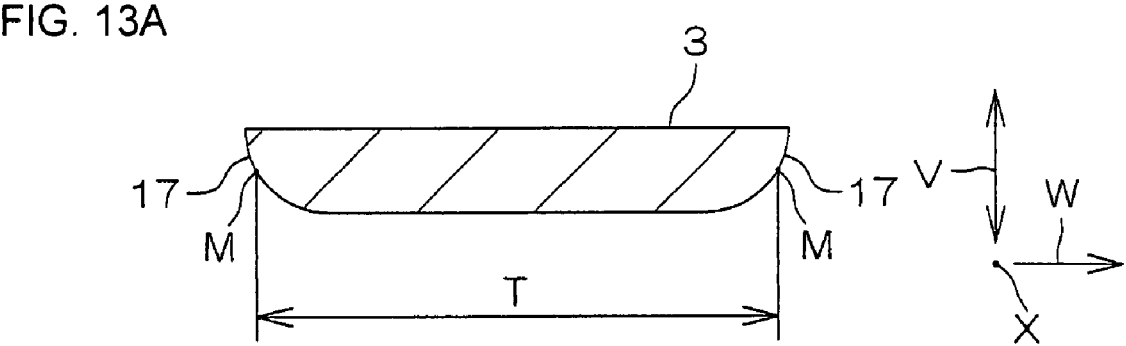
FIG. 13A is a view for showing still another embodiment of the invention, which is a cross section of the first pin when viewed in a chain traveling direction.
Figure 13B:
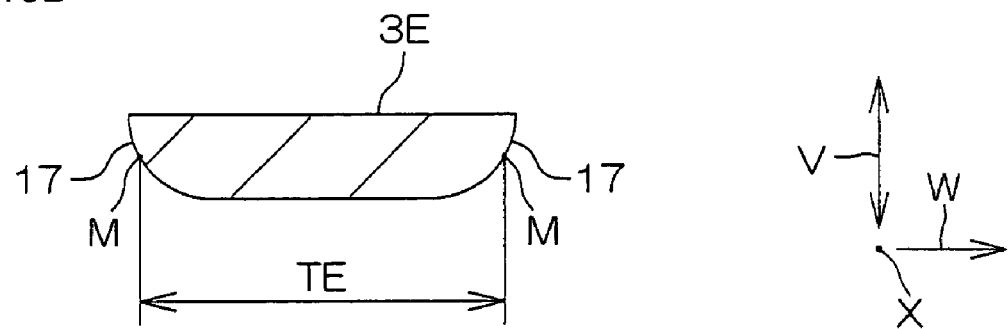
FIG. 13B is a view for showing still another embodiment of the invention, which is a cross section of the first pin when viewed in the chain traveling direction.

FIG. 13 is a view used for showing still another embodiment of the invention. FIG. 13(A) and FIG. 13(B) are cross sections of the first pin when viewed in the chain traveling direction X.

In this embodiment, differences from the embodiment shown in FIG. 1 through FIG. 8 will be chiefly described. Similar components are labeled with similar reference numerals and descriptions of these components are omitted herein.

Referring to FIG. 13(A) and FIG. 13(B), this embodiment is characterized in that contact cycles in which the respective first pins successively come into contact with the corresponding sheave surfaces of the respective pulleys are randomized.

To be more concrete, first pins 3 and 3E are provided as plural types of the first pins each having a different distance between the center points of contact in a pair of the end faces. A distance TE between the center points of contact M of a pair of the end faces 17 of the first pin 3E in the chain width direction W is made shorter than a distance T between the center points of contact M of a pair of the end faces 17 of the first pin 3 (TE<T).

The first pins 3 and the first pins 3E are arranged randomly in the chain traveling direction X. The phrase, "arranged randomly", in this case means that at least one of the first pins 3 and the first pins 3E are disposed irregularly at least in part in the chain traveling direction X.

Figure 14:
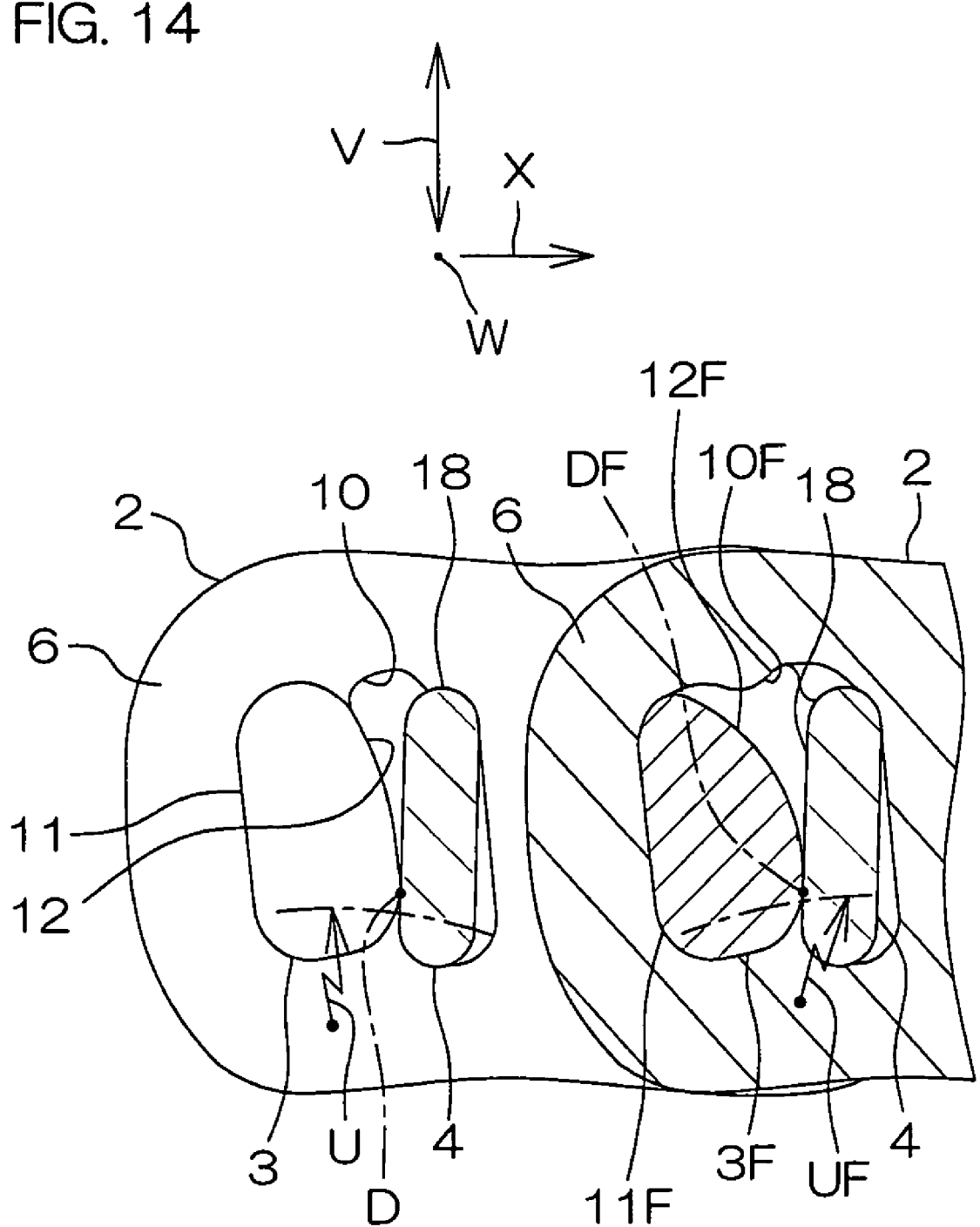
FIG. 14 is a partial cross section of a major portion according to still another embodiment of the invention.

FIG. 14 is a partial cross section of a major portion of still another embodiment of the invention. In this embodiment, differences from the embodiment shown in FIG. 1 through FIG. 8 will be chiefly described. Similar components are labeled with similar reference numerals and descriptions of these components are omitted herein.

Referring to FIG. 14, this embodiment is characterized in that contact cycles in which the respective first pins successively come into contact with the corresponding sheave surfaces of the respective pulleys are randomized.

To be more concrete, first pins 3 and 3F are provided as plural types of the first pins each having different trajectory of the rolling and sliding contact (movement) of the contact portion in association with the bending of the links 2 with respect to each other.

The sectional shape of the front portion 12F of the circumferential surface 11F of the first pin 3F is formed in a shape different from the sectional shape of the front portion 12 of the first pin 3. For example, in the sectional shape of the front portion 12F, a portion positioned on the outer side in the chain's diameter direction with respect to the contact portion DF in the linear region of the chain is formed in an involute curve. The radius UF of the base circle of this involute curve is made smaller than the radius U of the base circle of the involute curve of the cross section of the front portion 12 of the first pin 3 (UF<U).

According to the configuration described above, the trajectory of the rolling and sliding contact of the contact portion D of the first pin 3 in reference to the first pin 3 and the trajectory of the rolling and sliding contact of the contact portion DF of the first pin 3F in reference to the first pin 3F are different from each other.

The first pins 3 and the first pins 3F are arranged randomly in the chain traveling direction X. The phrase, "arranged randomly", in this case means that at least one of the first pins 3 and the first pins 3F are disposed irregularly at least in part in the chain traveling direction X.

Figure 15:
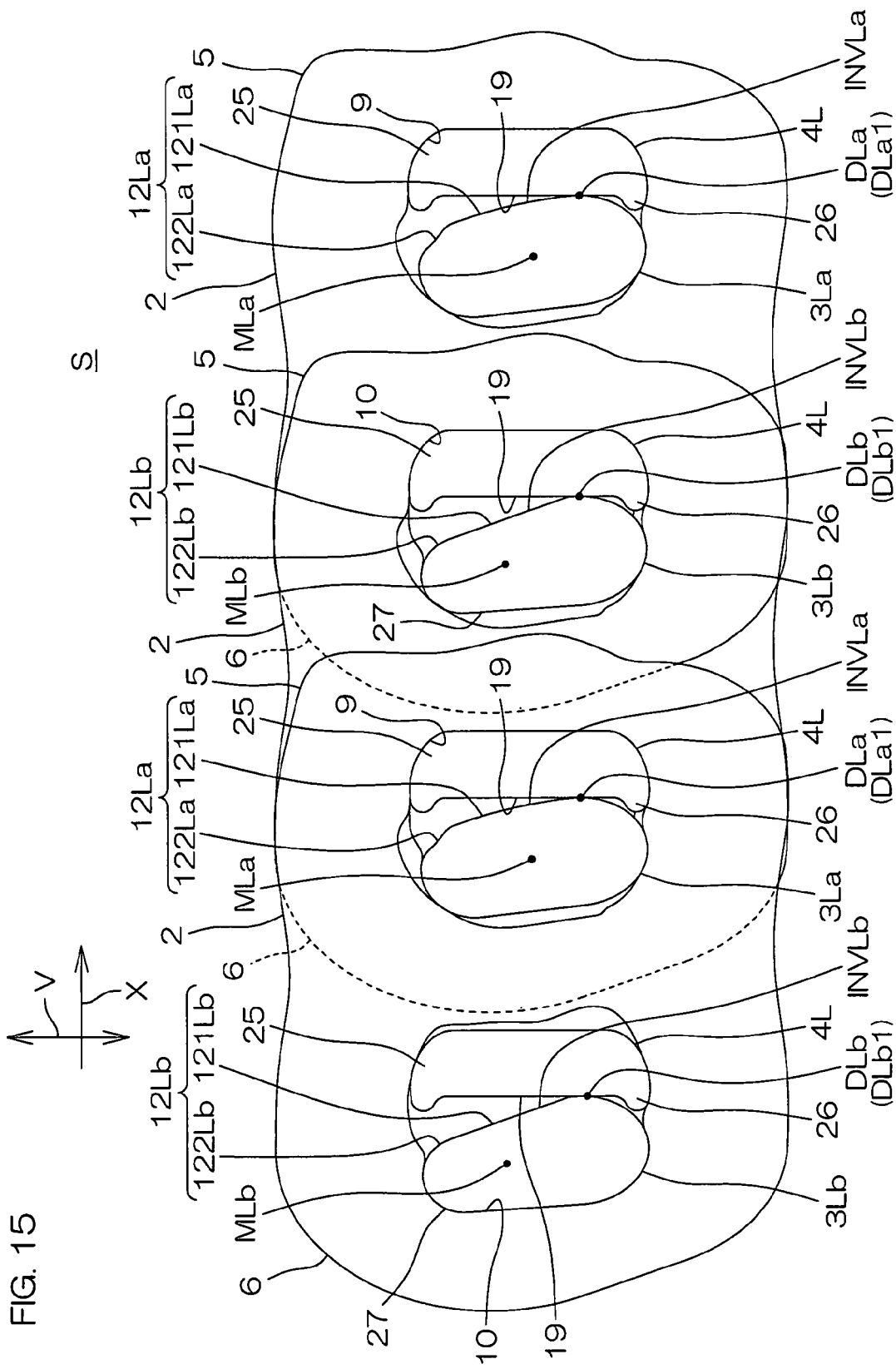
FIG. 15 is a side view of a major portion according to still another embodiment of the invention.
Figure 16:
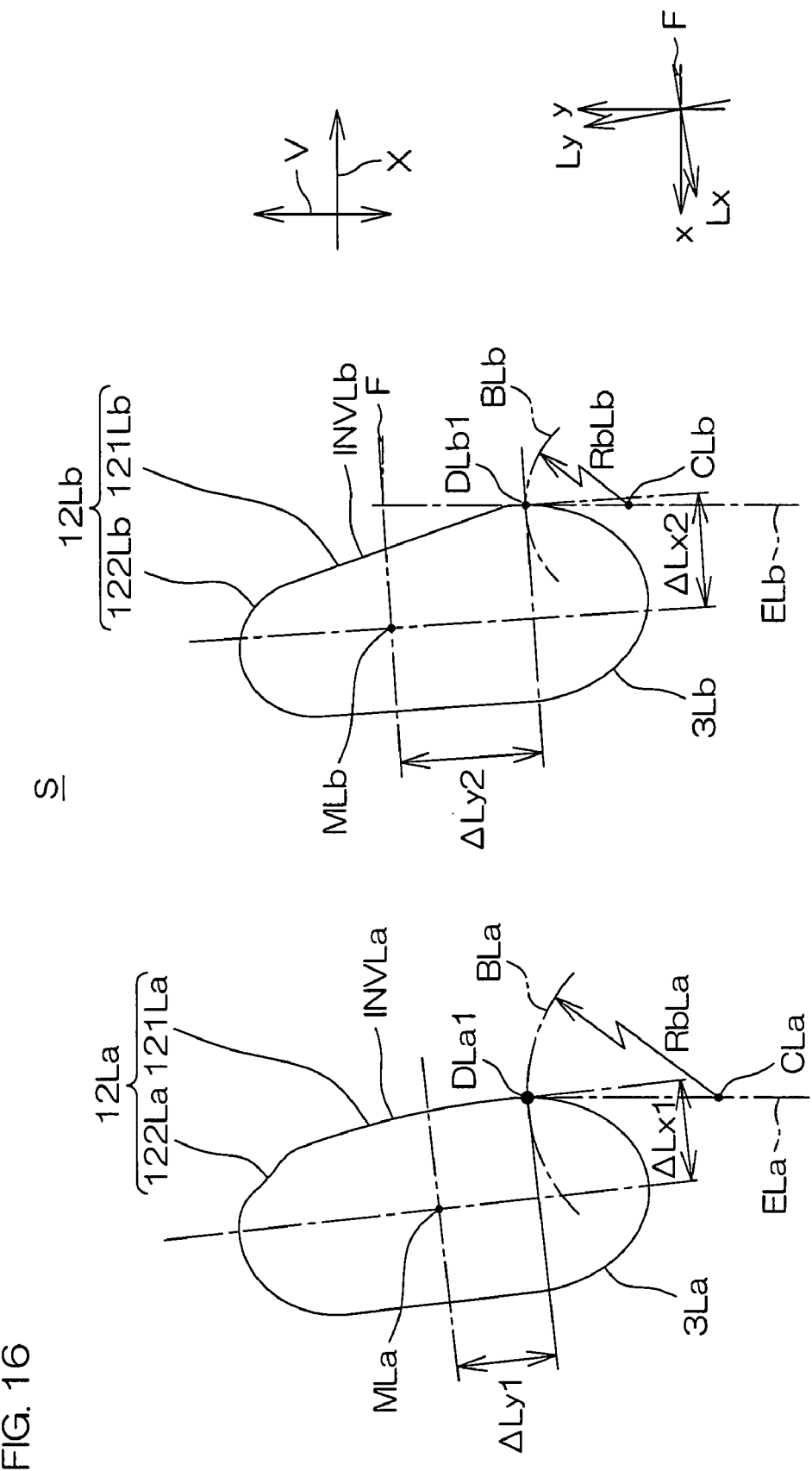
FIG. 16 is an enlarged view of a first type pin and a second type pin.

As are shown in FIG. 15 and FIG. 16, it may be different not only in the relative position of the contact portion and the center point of contact when the linear region of the chain is viewed in the chain width direction, but also in the trajectory of the rolling and sliding contact of the contact portion in each type of the first pins.

To be more concrete, first type pins 3La and second type pins 3Lb are provided as plural types of the first pins.

The front portion 12La of the first type pin 3La includes a main body portion 121La serving as a rate-of-change increasing portion that comes into rolling and sliding contact with the rear portion 19 of the second pin 4L at the contact portion DLa, and an avoid portion 122La. The main body portion 121La is configured to increase a rate-of-change of an displacement amount of the contact portion DLa according to an increase of the angle of bend of the links 2 with respect to each other.

Likewise, the front portion 12Lb of the second type pin 3Lb includes a main body portion 121Lb serving as a rate-of-change increasing portion that comes into rolling and sliding contact with the rear portion 19 of the second pin 4L at the contact portion DLb, and an avoid portion 122Lb. The main body portion 121Lb is configured to increase a rate-of-change of a displacement amount of the contact portion DLb according to an increase of the angle of bend of the links 2 with respect to each other.

The involute curve INVLa as a predetermined curve of the cross section (when viewed in the chain width direction W) of the main body portion 121La of the first type pin 3La is based on a base circle BLa having the center CLa and the radius RbLa. The center CLa is disposed on a plane ELa orthogonal to the chain traveling direction X and including the contact portion DLa1 in the linear region of the chain. The involute curve INVLa and the contact portion DLa1 intersect with each other.

Likewise, the involute curve INVLb as a predetermined curve of the cross section (when viewed in the chain width direction W) of the main body portion 121Lb of the second type pin 3Lb is based on a base circle BLb having the center CLb and the radius RbLb. The center CLb is disposed on a plane ELb orthogonal to the chain traveling direction X and including the contact portion DLb1 in the liner region of the chain. The involute curve INVLb and the contact portion DLb1 intersect with each other.

The radius RbLa of the base circle BLa of the involute curve INVLa of the first type pin 3La takes a relatively large value, and is set to 60 mm, for example. The radius RbLb of the base circle BLb of the involute curve INVLb of the second type pin 3Lb takes a relatively small value, and is set to 45 mm, for example.

In other words, the first type pin 3La is provided as a main power transmission member of a first type having a relatively large radius of curvature of the base circle, and the second type pin 3Lb is provided as a main power transmission member of a second type having a relatively small radius of curvature of the base circle.

Accordingly, the trajectory of the rolling and sliding contact of the contact portions DLa and DLb of the first type pin 3La and the second type pin 3Lb are different from each other, respectively.

The radius RbLb of the base circle BLb of the involute curve INVLb of the second type pin 3Lb is set to fall within a range of 60% to 85%, for example 75% in this embodiment of the radius RbLa of the base circle BLa of the involute curve INVLa of the first type pin 3La. The contact portion DLa1 of the first type pin 3La and the contact portion DLb1 of the second type pin 3Lb (the starting point of the involute curve INVLa of the first type pin 3La and the starting point of the involute curve INVLb of the second type pin 3Lb) are aligned side-by-side on a straight line in the chain traveling direction X.

The projection plane S orthogonal to the chain width direction W is provided with a 2-dimensional relative coordinate system having an Lx-axis that is inclined by the angle of attack F with respect to the chain traveling direction X and moves to the inner side in the chain radius direction as it is headed to a direction opposite to the chain traveling direction X and an Ly-axis extending orthogonally to the Lx-axis.

When the contact portion DLa1 and the center point of contact, MLa, of the first type pin 3La are projected onto the projection plane S, the coordinate of projected point of the center point of contact MLa having a projected point of contact portion DLa1 as the origin (hereinafter, referred to simply as the coordinate of the projected point of the center point of contact MLa of the first type pin 3La) in the relative coordinate system is regarded as ($\Delta Lx1$, $\Delta Ly1$), for example. In other words, the center point of contact MLa is spaced apart from the contact portion DLa1 of the first type pin 3La by ΔLx1 in the Lx-axis direction and by ΔLx1 in the Ly-axis direction.

Likewise, when the contact portion DLb1 and the center point of contact MLb of the second type pin 3Lb are projected onto the projection plane S, the coordinate of projected point of the center point of contact MLb having a projected point of contact portion DLb1 as the origin (hereinafter, referred to simply as the coordinate of the projected point of the center point of contact MLb of the second type pin 3Lb) is regarded as (ΔLx2, ΔLy2), for example. In other words, the center point of contact MLb is spaced apart from the contact portion DLb1 of the second type pin 3Lb by ΔLx2 in the Lx-axis direction and by ΔLy2 in the Ly-axis direction.

ΔLy1 of the first type pin 3La is made relatively short and the ΔLy2 of the second type pin 3Lb is made relatively long (ΔLy1<ΔLy2). More specifically, the relative position of the contact portion DLa1 and the center point of contact MLa of the first type pin 3La is set relatively close to each other in the Ly-axis direction as the direction corresponding to the chain radius direction. Meanwhile, the relative position of the contact portion DLb1 and the center point of contact MLb of the second type pin 3Lb is set relatively far from each other in the Ly-axis direction.

A difference between ΔLy1 and ΔLy2 (ΔLy2−Ly1) is set to fall within a range of 0.05 mm to 0.4 mm, for example. ΔLx1 of the first type pin 3La and the ΔLx2 of the second type pin 3Lb may be of the same value or different values.

In the relative coordinate system comprising the x-axis and the y-axis, too, the relative distance between the contact portion DLb1 and the center point of contact MLb of the second type pine 3Lb in the y-axis direction is longer than the relative distance between the contact portion DLa1 and the center point of contact MLa of the first type pin 3La in the y-axis direction.

In other words, when the linear region of the chain is viewed in the chain width direction W, the relative position of the contact portion DLa1 and the center point of contact MLa of the first type pin 3La is set relatively close to each other in the chain radius direction. Further, when the linear region of the chain is viewed in the chain width direction W, the relative position of the contact portion DLb1 and the center point of contact MLb of the second type pin 3Lb is set relatively far from each other in the chain radius direction.

The second pin 4L has a pair of rib portions 25 and 26 at a pair of end portions in the chain radius direction (the end portion on the outer side in the chain radius direction and the end portion on the inner side in the chain radius direction). The pair of end portions in the chain radius direction each protrudes in a direction opposite to the chain traveling direction X. Accordingly, stress induced in the link 2 is made low by increasing the contact areas in press-insert portions of the link 2 and the second pin 4L.

The second pin 4L may be provided with the rib portion 25 or the rib portion 26 only at one of a pair of the end portions in the chain radius direction.

The avoid portion 122La as a concave portion in the first type pin 3La is provided to avoid contact with the rib portion 25 at one end of the second pin 4L on the outer side in the chain's diameter direction. The avoid portion 122La is provided in the circumferential surface of the first type pin 3La between a portion 27 press-inserted into the rear through-hole 10 and the main body portion 121La when viewed in the chain width direction W, and formed in a concave shape with respect to the main body portion 121La. Accordingly, when the contact portion DLa of the first type pin 3La and the second pin 4 are displaced in association with the bending of the links 2 with respect to each other, it is possible to prevent the rib portion 25 at one end from coming into contact with the first type pin 3La. Plural concaves may be formed in the avoid portion 122La.

The avoid portion 122Lb of the second type pin 3Lb is provided to avoid contact with the rib portion 25 at one end of the second pin 4L on the outer side in the chain's diameter direction. The avoid portion 122Lb is formed in a curved surface that continuously and smoothly continues to the main body portion 121Lb. Because the radius RbLb of the base circle BLb of the involute curve INVLb of the main body portion 121Lb is made relatively small, the end portion of the main body portion 121Lb on the outer side in chain's diameter direction is located sufficiently behind the second pin 4L in the chain traveling direction X. Accordingly, it is possible to avoid contact with the rib portion 25 at one end of the second pin 4L without forming the avoid portion 122Lb in a concave shape. The avoid portion 122Lb of the second type pin 3Lb may be formed in a plane.

As has been described, it is possible to distinguish between the first type pin 3La and the second type pin 3Lb with ease by differentiating the shape of the avoid portion 122La of the first type pin 3La and the shape of the avoid portion 122Lb of the second type pin 3Lb from each other.

The first type pins 3La and the second type pins 3Lb are arranged randomly in the chain traveling direction X. The phrase, "arranged randomly", in this case means that at least one of the first type pins 3La and the second type pin 3Lb are disposed irregularly at least in part in the chain traveling direction X.

Regarding the numbers of the first type pins 3La and the second type pins 3Lb provided to the chain, the number of the second type pins 3Lb is relatively small. Alternatively, the number of the first type pin 3La and the number of the second type pin 3Lb may be equal, or the number of the second type pins 3Lb may be relatively large.

According to this embodiment, it is possible to distribute the frequency of mesh sounds over a broad range when the first type pins 3La and the second type pins 3Lb are successively meshed with the pulleys to allow the peak value of the noises extremely small. It is therefore possible to further reduce vibrations and noises made while the chain is driven.

Figure 17:
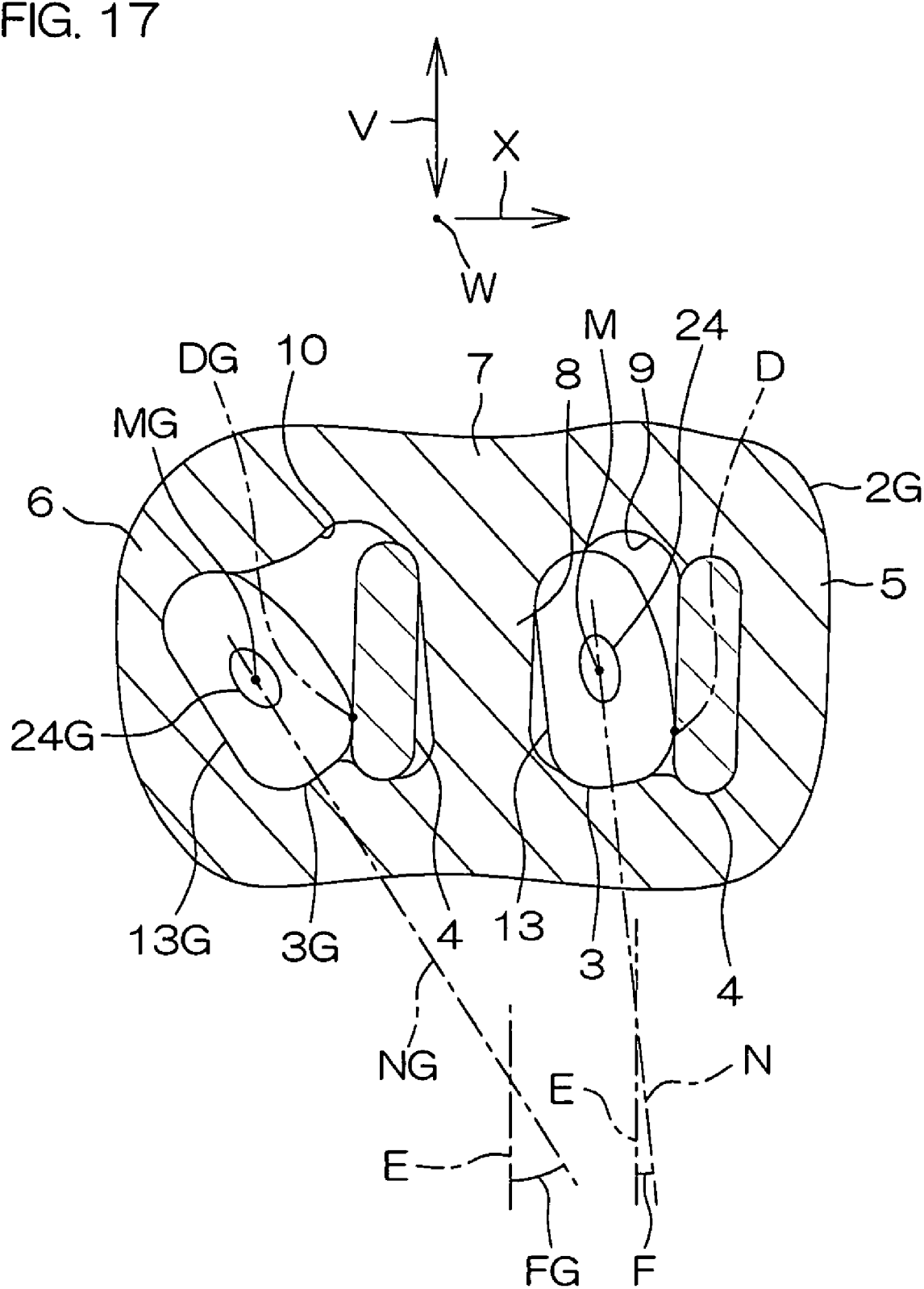
FIG. 17 is a partial cross section of a major portion according to still another embodiment of the invention.

FIG. 17 is a partial cross section of a major portion according to still another embodiment of the invention. In this embodiment, differences from the embodiment shown in FIG. 1 through FIG. 8 will be chiefly described. Similar components are labeled with similar reference numerals, and descriptions of these components are omitted herein.

Referring to FIG. 17, this embodiment is characterized in that contact cycles in which the respective first pins successively come into contact with the corresponding sheave surfaces of the respective pulleys are randomized.

To be more concrete, first pins 3 as small angle-of-attack pins having a relatively small angle of attack and first pins 3G as large angle-of-attack pins having a relatively large angle of attack are provided as plural types of the first pins each having a different angle of attack (inclination) of the major axis serving as a predetermined portion in the contact region in the chain linear region.

The angle of attack F of the first pin 3 and the angle of attack FG of the first pin 3G are different from each other. The angle of attack F of the first pin 3 is made smaller than the angle of attack FG of the first pin 3G (F<FG).

The first pins 3 and the first pins 3G are arranged randomly in the chain traveling direction X. The phrase, "arranged randomly", in this case means that at least one of the first pins 3 and the first pins 3G are disposed irregularly at least in part in the chain traveling direction X.

Figure 18A:
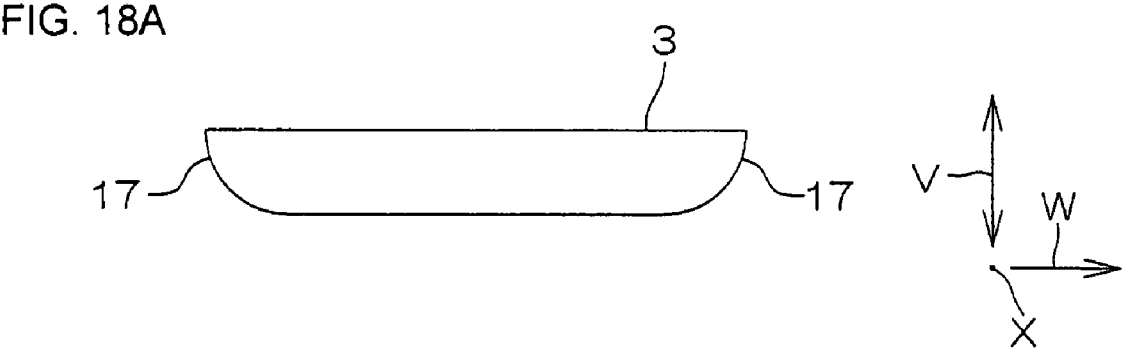
FIG. 18A is a view for showing still another embodiment of the invention, which is a side view of the first pin when viewed in the chain traveling direction.
Figure 18B:
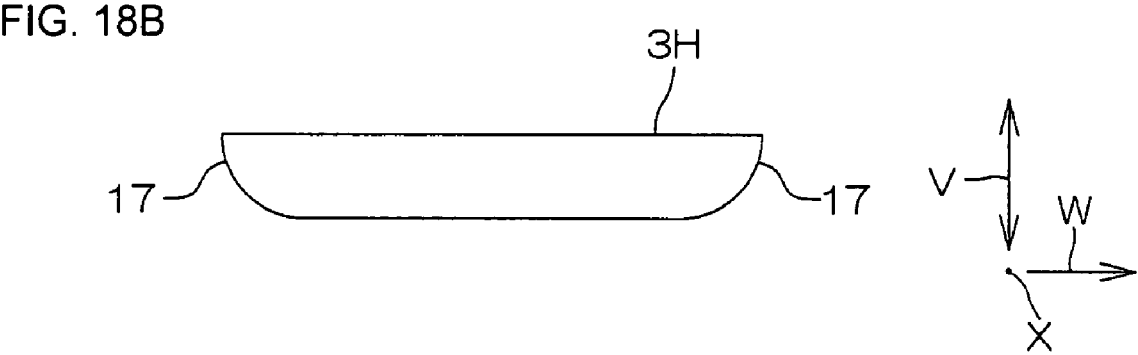
FIG. 18B is a view for showing still another embodiment of the invention, which is a side view of the first pin when viewed in the chain traveling direction.

FIG. 18 is a view for showing still another embodiment of the invention. FIG. 18(A) and FIG. 18(B) are side views of the first pin when viewed in the chain traveling direction X. In this embodiment, differences from the embodiment shown in FIG. 1 through FIG. 8 will be chiefly described. Similar components are labeled with similar reference numerals and descriptions of these components are omitted herein.

Referring to FIG. 18(A) and FIG. 18(B), this embodiment is characterized in that contact cycles in which the respective first pins successively come into contact with the corresponding sheave surfaces of the respective pulleys are randomized.

To be more concrete, first pins 3 as high-rigid pins having relatively high rigidity and first pins 3H as low-rigid pins having relatively low rigidity are provided as plural types of the first pins each having different rigidity (coefficient of elasticity).

As has been descried above, the first pins 3 are made of, for example, SUJ2 (high carbon chromium bearing steel) according to JIS (Japanese Industrial Standard), and the first pins 3H are made of SUS440C (martensitic stainless steel).

The first pins 3 and the first pins 3H are arranged randomly in the chain traveling direction X. The phrase, "arranged randomly", in this case means that at least one of the first pins 3 and the first pins 3H are disposed irregularly at least in part in the chain traveling direction X.

According to the configuration above, amounts of deflection of the first pins 3 and the first pins 3H when a tensile force is induced in the chain 1 are different. As a consequence, cycles in which the respective first pins 3 and 3H are successively meshed with the respective pulleys is randomized.

Figure 19:
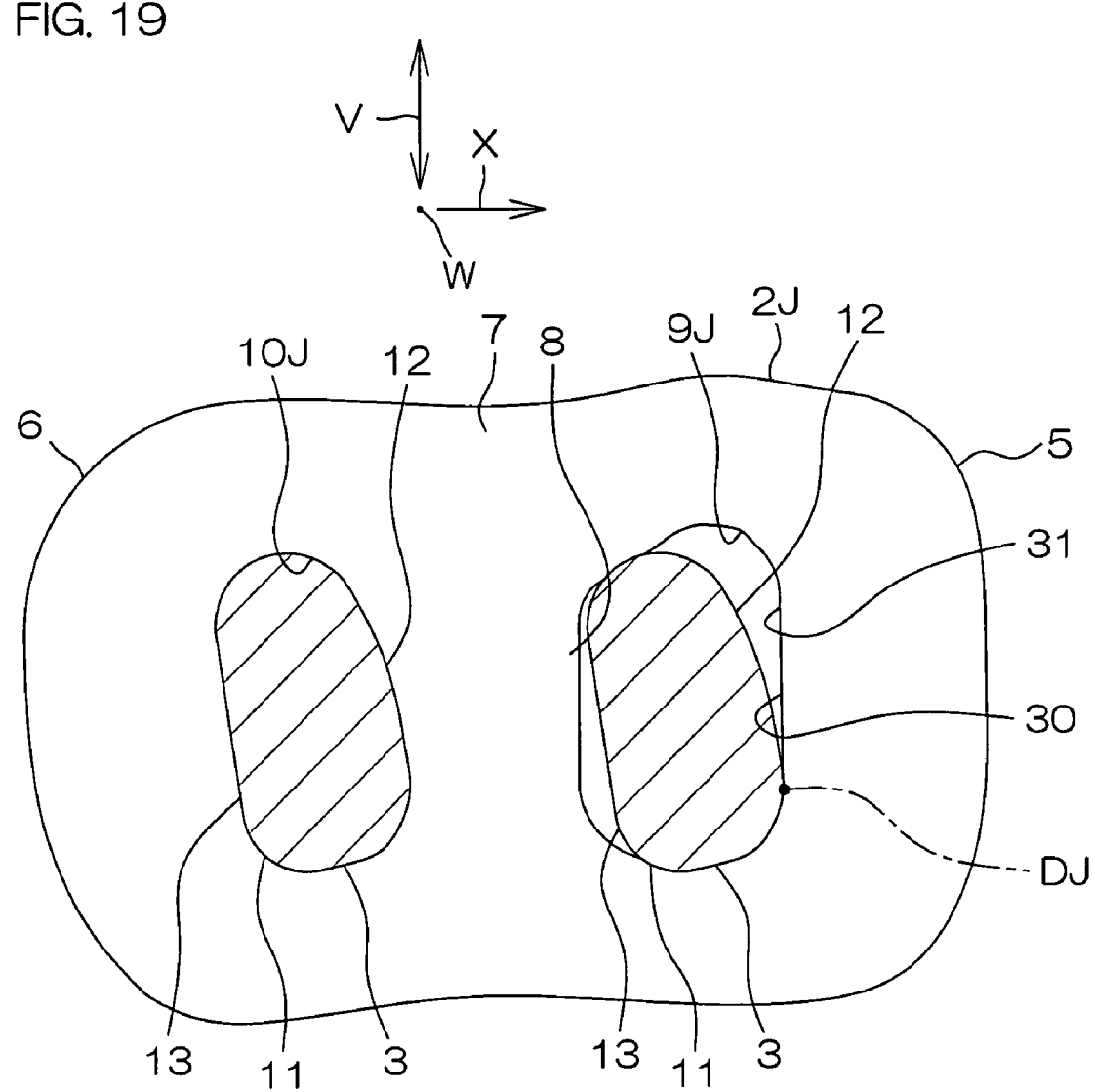
FIG. 19 is a partial cross section of a major portion according to still another embodiment of the invention.

FIG. 19 is a partial cross section of a major portion according to still another embodiment of the invention. In this embodiment, differences from the embodiment shown in FIG. 1 through FIG. 8 will be chiefly described. Similar components are labeled with similar reference numerals and descriptions of these components are omitted herein.

Referring to FIG. 19, this embodiment is characterized in that the links 2J adjacent to each other in the chain traveling direction X are coupled with a single first pin 3 serving as the coupling member to be relatively rotatable (bendable) with respect to each other. To be more concrete, a corresponding first pin 3 is loose fit into the front through-hole 9J of each link 2J serving as the counter member to be able relatively movable, and the corresponding first pin 3 is press-fit into the rear through-hole 10J of each link 2J to be inhibited from moving relatively.

The front portion 31 of the rim portion 30 of the front through-hole 9J in the chain traveling direction X has a sectional shape extending in the orthogonal direction V, and comes into rolling and sliding contact with the front portion 12 of the first pin 3 loose fit into the front through-hole 9J at the contact portion DJ. Accordingly, the link 2J and the first pin 3 loose fit into this link 2J come into rolling and sliding contact with each other.

According to this embodiment, it is possible to increase the number of the first pins 3 that are meshed with the respective pulleys at a time by reducing the coupling pitch among the first pins 3. It is thus possible to reduce a collision force with the respective pulleys by reducing a load per first pin 3 to further reduce the noises.

It should be appreciated that the invention is not limited to the embodiments described above. For example, in the embodiment shown in FIG. 1 through FIG. 8, the end faces 17 of the first pin 3 may be formed in a spherical surface having plural radii of curvature. Further, the first pins 3 may include three or more types of pins each having a different relative position of the contact portion and the center point of contact when viewed in the chain width direction.

Additionally, in the embodiment shown in FIG. 9, the two directions in which the crowning process is applied to each end face 17A of the first pin 3A when viewed in the chain width direction W are not limited to the two directions described above, or may by other directions.

Further, in the embodiment shown in FIG. 10, the end faces 17B of the first pin 3B may be formed in a cylindrical surface having plural radii of curvature.

In addition, in the embodiment shown in FIG. 11, the direction in which the crowning process is applied to each end face 17C of the first pin 3C when viewed in the chain width direction W is not limited to the direction specified above, or may be another direction.

Furthermore, in the embodiment shown in FIG. 12, three or more types of links each having a different coupling pitch may be provided.

In addition, in the embodiment shown in FIG. 13, three or more types of the first pins each having a different distance between the center points of contact in a pair of power transmission surfaces may be provided.

Further, in the embodiment shown in FIG. 14, three or more types of the first pins each having different trajectory of the rolling and sliding contact of the contact portion may be provided.

In the embodiment shown in FIG. 17, the angle of attack F of the major axis N of the contact ellipse 24 and the angle of attack FG of the major axis NG of the contact ellipse 24G may be different from each other while the rear portion 13 of the first pin 3 and the rear portion 13G of the first pin 3G are parallel to each other. In addition, three or more types of the first pins each having a different angle of attack may be provided.

Further, in the embodiment shown in FIG. 18, three or more types of the first pins each having different rigidity may be provided.

In each of the embodiment shown in FIG. 9, the embodiment shown in FIG. 10, and the embodiment shown in FIG. 11, any one of the random means described above may be further provided.

Further, in each of the embodiment shown in FIG. 1 through FIG. 8, the embodiment shown in FIG. 9, the embodiment shown in FIG. 10, the embodiment shown in FIG. 11, the embodiment shown in FIG. 12, the embodiment shown in FIG. 13, the embodiment shown in FIG. 14, the embodiment shown in FIG. 15 through FIG. 16, the embodiment shown in FIG. 17, and the embodiment shown in FIG. 18, two or more of the random means described above may be used in combination. For example, the noise reducing effect is significantly enhanced by configuring the first pins to include three or more types of pins each having a different relative position of the contact portion and the center point of contact, and providing plural types of the links each having a different coupling pitch.

In the embodiment shown in FIG. 15 through FIG. 16, plural types of links each having a different coupling pitch may be used. In this case, too, the noise reducing effect can be sufficiently achieved.

Further, the first pin may be loose fit into the rear through-hole of each link to be relatively movable. Further, the second pin 4 may be loose fit into the front through-hole of each link to be relatively movable. Further, the second pins 4 may be engaged with the respective pulleys 60 and 70.

The trajectory of the rolling and sliding contact between the first and second pins making a pair may not draw an involute curve. To be more concrete, the sectional shape of the front portion of the first pin may be formed so as not to include the involute curve, or the sectional shape of the rear portion 19 of the second pin 4 may not be formed in a linear shape. Further, the sectional shape of the front portion of the first pin and the sectional shape of the rear portion 19 of the second pin 4 may be interchanged with each other.

In addition, in the embodiment shown in FIG. 19, the shape of the end faces of the first pin 3 may be of the shape subjected to the crowning process in each of two directions that cross each other as with the embodiment shown in FIG. 9, or the cylindrical surface as with the embodiment shown in FIG. 10, or the shape subjected to the crowning process in one predetermined direction as with the embodiment shown in FIG. 11.

Further, the first pin 3 may be loose fit into the rear through-hole 10G of each link 2G to be relatively movable. Further, the trajectory of the rolling and sliding contact with the first pin 3 as the counterpart of a pair and the corresponding link 2G may not draw an involute curve. To be more concrete, the sectional shape of the front portion 12 of the first pin 3 may not include the involute curve, or the sectional shape of the front portion 31 of the front through-hole 9G of the link 2G may not include the linear shape. Further, the sectional shape of the front portion 12 of the first pin 3 and the sectional shape of the front portion 31 of the front through-hole 9G of the link 2G may be interchanged with each other.

Alternatively, randomizing means same as any one of the random means described above may be further provided, or randomizing means same as two or more of the random means described above may be further provided.

Moreover, in each of the embodiments described above, the relative position of the contact portion and the center point of the contact when the linear region of the chain is viewed in the chain width direction W may be different in each type of the first pins by differentiating the radius of curvature of the end faces of the first pin in each type of the first pins. Further, three or more types of the first pins each having a different relative position of the contact portion and the center point of the contact when the linear region of the chain is viewed in the chain width direction W may be provided.

Further, plural types of first pins may be included, each of which has a different relative position of the contact portion and the center point of contact only in the orthogonal direction V (y-axis direction) or the Ly direction when the linear region of the chain is viewed in the chain width direction W. Likewise, plural types of first pins may be included, each of which has a different relative position of the contact portion and the center point of contact in the direction only along the chain traveling direction X (x-axis direction) or the Lx direction when the linear region of the chain is viewed in the chain width direction W.

Further, when viewed in the chain width direction W, the back portion of the first pin and the major axis of the contact region of the first pin may be inclined with respect to each other.

Further, the invention may be applied to a power transmission chain of a so-called block type, in which members having the power transmission surfaces same as the end faces of the first pin are disposed in close proximity to a pair of the end portions of the first pin in the first pin's longitudinal direction.

The locations of the front through-hole and the rear through-hole of the link may be interchanged with each other. Further, a communication groove (slit) may be provided in the pillar portion between the front through-hole and the rear through-hole of the link. In this case, it is possible to increase an amount of elastic deformation (flexibility) of the link, to further reduce the stress induced in the link.

In addition, the invention is not limited to the mode in which the groove width is varied in both the drive pulley 60 and the driven pulley 70. The invention may be in a mode in which the groove width of either one of the pulleys is varied while the groove width of the other pulley does not vary and stay at a fixed width. Further, the embodiments above have described the mode in which the groove widths are varied continuously (in a stepless manner). The invention, however, can be applied to other power transmission devices in which the groove widths are varied step-by-step or fixed (no gear change).

While the embodiments of the invention have been described in detail, modifications, alternations, and equivalents readily may occur to those skilled in the art who understand the contents described above. It should be understood that the invention is therefore limited by the scope of the appended claims and the equivalents thereof.

This application corresponds to Japanese Patent Application No. 2005-29574 filed with the Japanese Patent Office on Feb. 4, 2005, and Japanese Patent Application No. 2005-301033 filed with the Japanese Patent Office on Oct. 14, 2005, the entire contents of which are incorporated herein by reference.

EXAMPLES

Comparative Examples 1 and 2 and Examples 1 and 2

Comparative examples 1 and 2 and Examples 1 and 2 were fabricated as follows regarding a power transmission chain having first and second pins with the end faces of the first pins comprising part of a spherical surface.

In Comparative Example 1, the end faces of each of the first pins were of the same shape, and the relative position of the contact portion and the center point of contact when viewed in the chain width direction was the same in each of the first pins.

In addition, all the coupling pitches were made equal.

In Comparative Example 2, the end faces of each of the first pins were of the same shape, and the relative position of the contact portion and the center point of contact when viewed in the chain width direction was the same in each of the first pins.

Regarding the coupling pitch, two coupling pitches were set by providing short pitch links having a relatively short coupling pitch and long pitch links having a relatively long coupling pitch. A ratio of the coupling pitch of the long pitch links to the coupling pitch of the short pitch links was about 1.2. The short pitch links and the long pitch links were disposed randomly in the chain traveling direction.

In Example 1, the first pins had two types of the first pins each having a different shape of the end faces. The relative position of the contact portion and the center point of contact in a direction orthogonal to both the chain traveling direction and the chain width direction (orthogonal direction, y-axis direction) when viewed in the chain width direction was different by about 0.2 mm in each type of the first pins. The first pins of these two types were disposed randomly in the chain traveling direction.

In addition, all the coupling pitches were equal.

In Example 2, the first pins had two types of the first pins each having a different shape of the end faces. The relative position of the contact portion and the center point of contact in a direction orthogonal to both the chain traveling direction and the chain width direction (orthogonal direction, y-axis direction) when viewed in the chain width direction was different by about 0.2 mm in each type of the first pins. The first pins of these two types were disposed randomly in the chain traveling direction.

Regarding the coupling pitch, two coupling pitches were set by providing short pitch links having a relatively short coupling pitch and long pitch links having a relatively long coupling pitch. A ratio of the coupling pitch of the long pitch links to the coupling pitch of the short pitch links was about 1.2. The short pitch links and the long pitch links were disposed randomly in the chain traveling direction.

Power transmission devices were manufactured by winding the chains of Comparative Examples 1 and 2 and Examples 1 and 2 over a corresponding pair of pulleys, and a relative velocity of the first pins and one of the pulleys at the time of collision was observed by driving the power transmission devices, respectively. The results are set forth in FIG. 20.

In each graph of FIG. 20, the abscissa represents the number of collisions (mesh frequency) of the first pins and the pulley per second, and the ordinate represents the relative velocity at the time of collision of both the first pins and the pulley.

Figure 20A:
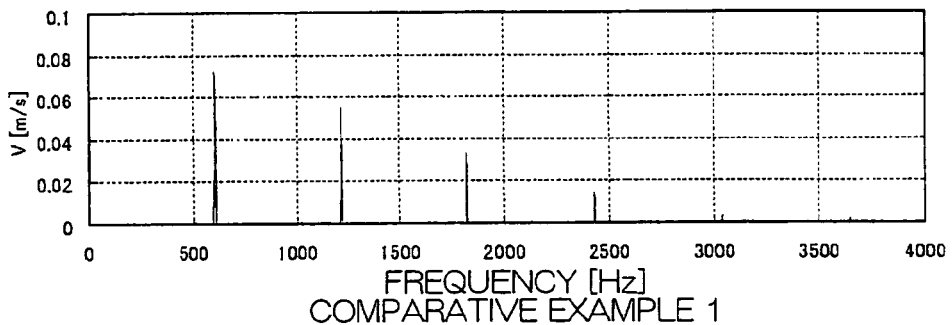
FIG. 20A is a graph showing a relation of a mesh frequency of the chain and a relative trajectory of the first pin and one of the pulleys at the time of collision in Comparative Example 1.

As is shown in FIG. 20A, in Comparative Example 1, resonances occur in cycles at a particular mesh frequency (frequency at about an integral multiple of 600), and the relative velocity when the first pins and the pulley collide with each other is high to generate a high peak. Consequently, energy at the time of collision of the first pins and the pulley is large, which gives rise to large noises.

Figure 20B:
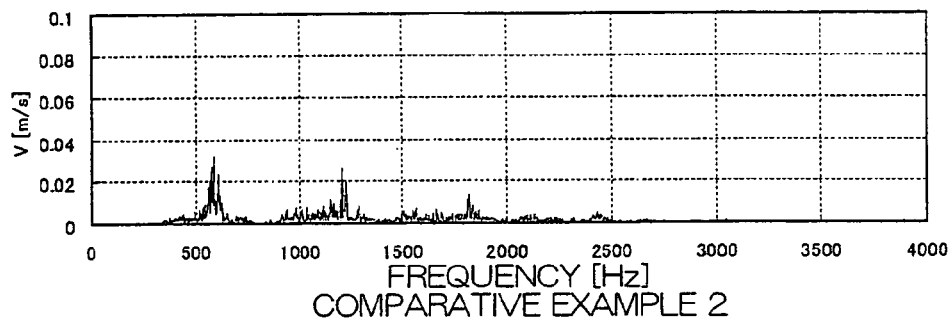
FIG. 20B is a graph showing a relation of a mesh frequency of the chain and a relative trajectory of the first pin and one of the pulleys at the time of collision in Comparative Example 2.

As is shown in FIG. 20(B), in Comparative Example 2, the relative velocity at the particular mesh frequency when the first pins and the pulley collide with each other is suppressed in comparison with Comparative Example 1. However, as with Comparative Example 1, resonances occur in cycles at the particular mesh frequency, and peaks are generated. The relative v velocity when the first pins and the pulley collide with each other is therefore high. Consequently, energy at the time of collision of the first pins and the pulley is large, which gives rise to relatively large noises.

Figure 20C:
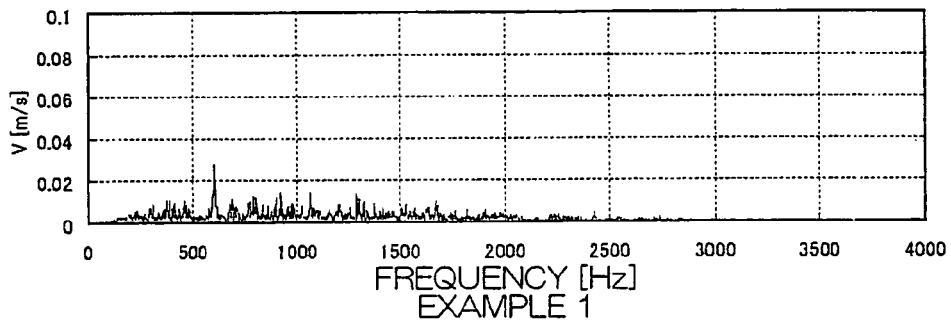
FIG. 20C is a graph showing a relation of a mesh frequency of the chain and a relative trajectory of the first pin and one of the pulleys at the time of collision in Example 1.

On the contrary, as is shown in FIG. 20(C), in Example 1, no peaks are generated in cycles at a particular mesh frequency. Moreover, the peak value is well below 0.04 m/s. The relative velocity when the first pins and the pulley collide with each other is therefore suppressed. It is thus possible to reduce noises by lowering energy at the time of collision of the first pins and the pulley.

Figure 20D:
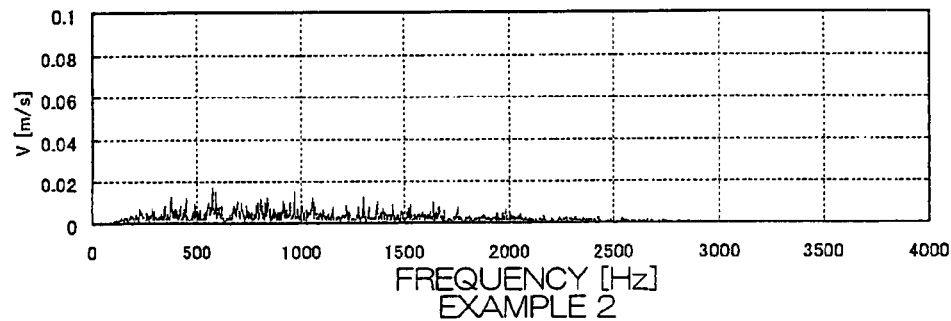
FIG. 20D is a graph showing a relation of a mesh frequency of the chain and a relative trajectory of the first pin and one of the pulleys at the time of collision in Example 2.

Further, as is shown in FIG. 20(D), in Example 2, no peaks are generated in cycles at a particular mesh frequency. Moreover, the peak value is well below 0.02 m/s. The relative velocity when the first pins and the pulley collide with each other is therefore further suppressed. It is thus possible to reduce noises further by lowering energy more at the time of collision of the first pins and the pulley.

As has been described, Examples 1 and 2 prove extremely excellent in quietness. In particular, Example 2, for example, proves that it is extremely effective to provide plural types of links each having a different coupling pitch in enhancing the quietness in addition to the configuration to provide plural types of first pins each having a different relative position of the contact portion and the center point of contact when viewed in the chain width direction.

The invention claimed is:

1. A power transmission chain that undergoes a transition alternately between a linear region and a region wound over a pulley, the chain comprising:
   plural link plates; and
   plural coupling members that couple the link plates to each other, the coupling members including
      a plurality of main power transmission members, and a plurality of counter members each being interposed between a corresponding link plate and a corresponding main power transmission member, each main power transmission member having
         a counter portion that opposes a corresponding counter member, the counter portion coming into contact with the corresponding counter member in a contact state that includes at least one of rolling contact and sliding contact at a contact portion that displaces in association with a bending of the power transmission chain; and
         a pair of end faces that oppose each other in a chain width direction, each end face having a contact region that is adapted to come into contact with a corresponding sheave surface of the pulley, the contact region including a center point of contact;
   wherein the main power transmission members include first and second type main power transmission members, the counter portion of the first type main power transmission member having a first involute curve based on a first base circle having a relatively large radius of curvature, and the counter portion of the second type main power transmission member having a second involute curve based on a second base circle having a relatively small radius of curvature; and
   wherein a position of the contact portion relative to the center point of contact of the first type main power transmission member in both a first and a second direction is different from a position of the contact portion relative to the center point of contact of the second type main power transmission member in both the first and the second direction, the first direction being orthogonal to the chain width direction and a chain traveling direction, and the second direction being different from the first direction and being in the chain traveling direction, when the linear region of the power transmission chain is viewed in the chain width direction.

2. The power transmission chain according to claim 1, wherein:
   the counter portion includes a rate-of-change increasing portion where a rate-of-change of a displacement amount at the contact portion increases according to an increase of an angle of bend between the link plates with respect to each other;
   the rate-of-change increasing portion forms curve based on the respective base circle when viewed in the chain width direction;
   a relative position of the contact portion and the center point of contact of the first type main power transmission member is set relatively close to each other in a chain radius direction when the linear region of the power transmission chain is viewed in the chain width direction; and
   a relative position of the contact portion and the center point of contact of the second type main power transmission member is set relatively far from each other in the chain radius direction when the linear region of the power transmission chain is viewed in the chain width direction.

3. The power transmission chain according to claim 1, wherein:
   when the center point of contact and the contact portion are projected onto a projection plane orthogonal to the chain width direction, in a 2-dimensional relative coordinate system within the projection plane, the relative position of the contact portion and the center point of contact varies along the chain traveling direction in each type of the main power transmission members.

4. The power transmission chain according to claim 1, wherein:
each of the end faces of the main power transmission members include a curved surface having a curvature in each of two directions that cross each other.

5. The power transmission chain according to claim 1, wherein:
each of the end faces of each of the main power transmission member is formed in a shape including part of a spherical surface.

6. The power transmission chain according to claim 1, wherein:
each of the coupling members includes an auxiliary power transmission member as the counter member;
the auxiliary power transmission member makes a pair with the main power transmission member; and
the auxiliary power transmission member is interposed between the link plate corresponding to the main power transmission member and the main power transmission member.

7. The power transmission chain according to claim 6, wherein:
each of the link plates includes first and second through-holes aligned in front and rear of a chain traveling direction;
the corresponding main power transmission member is fit into the first through-hole so as to be relatively movable while the corresponding auxiliary power transmission member is fit thereto so as to be inhibited from moving relatively; and
the corresponding main power transmission member is fit into the second through-hole so as to be inhibited from moving relatively while the corresponding auxiliary power transmission member is fit thereto so as to be relatively movable.

8. The power transmission chain according to claim 6, wherein:
the auxiliary power transmission member includes an end portion on an outer periphery in a chain radius direction and an end portion on an inner periphery in the chain radius direction; and
a rib portion is formed on at least one of the end portion on the outer periphery in the chain radius direction and the end portion on the inner periphery in the chain radius direction of the auxiliary power transmission member.

9. The power transmission chain according to claim 6, wherein:
the auxiliary power transmission member includes an end portion on an outer periphery in a chain radius direction and an end portion on an inner periphery in the chain radius direction;
a rib portion is formed on the end portion on the outer periphery in the chain radius direction of the auxiliary power transmission member; and
the main power transmission member is provided with a concave portion to avoid contact with the rib portion.

10. The power transmission chain according to claim 1, wherein:
a distance between center points of contact at the pair of end faces of the main power transmission member is made equal among the plural types of the main power transmission members.

11. The power transmission chain according to claim 1, wherein:
a crowning process is applied to each of the end faces of each of the main power transmission members in each of two directions that cross each other.

12. The power transmission chain according to claim 1, wherein:
each of the end faces of each of the main power transmission members is formed in a shape including part of a cylindrical surface.

13. The power transmission chain according to claim 1, wherein:
a crowning process is applied to each of the end faces of each of the main power transmission members in one predetermined direction.

14. The power transmission chain according to claim 1, wherein:
contact cycles in which each of the main power transmission member successively comes into contact with corresponding sheave surface of the pulley is randomized.

15. The power transmission chain according to claim 14, wherein:
the link plates include plural types of link plates disposed randomly in a chain traveling direction; and
a coupling pitch of the link plates in the chain traveling direction is different among the plural types of the link plates.

16. The power transmission chain according to claim 14, wherein:
the first and second type main power transmission members are disposed randomly in a chain traveling direction.

17. The power transmission chain according to claim 16, wherein:
a distance between the center points of contact between the pair of the end faces of the main power transmission member is different among the first and second type main power transmission members.

18. The power transmission chain according to claim 16, wherein:
a trajectory of movements of the contact portion in association with the bending of the link plates with respect to each other are different among the first and second type main power transmission members.

19. The power transmission chain according to claim 16, wherein:
an inclination of a predetermined portion in the contact region in each of the end faces in the chain traveling direction is different among the first and second type main power transmission members.

20. The power transmission chain according to claim 19, wherein:
the contact region is of an elliptic shape when viewed in the chain width direction; and
the predetermined portion in the contact region includes a major axis of the ellipse.

21. The power transmission chain according to claim 16, wherein:
the main power transmission members have a rigidity that differ from each other.

22. A power transmission device, comprising:
a pair of pulleys each having a pair of facing sheave surfaces in a shape of a conical surface; and
a power transmission chain that transmits power under a transition alternately between a linear region and a region wound over the pulley, the power transmission chain comprising:
plural link plates; and
plural coupling members that couple the link plates to each other, the coupling members including
a plurality of main power transmission members, and
a plurality of counter members each being interposed between a corresponding link plate and a corresponding main power transmission member, each main power transmission member having a counter portion that opposes a corresponding counter member, the counter portion coming into contact with the corresponding counter member in a contact state that includes at least one of rolling contact and sliding contact at a contact portion that displaces in association with a bending of the power transmission chain; and a pair of end faces that oppose each other in a chain width direction, each end face having a contact region that comes into contact with a corresponding sheave surface of the pulley, the contact region including a center point of contact;

wherein the main power transmission members include first and second type main power transmission members, the counter portion of the first type main power transmission member having a first involute curve based on a first base circle having a relatively large radius of curvature, and the counter portion of the second type main power transmission member having a second involute curve based on a second base circle having a relatively small radius of curvature; and wherein a position of the contact portion relative to the center point of contact of the first type main power transmission member in both a first and a second direction is different from a position of the contact portion relative to the center point of contact of the second type main power transmission member in both the first and the second direction, the first direction being orthogonal to the chain width direction and a chain traveling direction, and the second direction being different from the first direction and being in the chain traveling direction, when the linear region of the power transmission chain is viewed in the chain width direction.

* * * * *

UNITED STATES PATENT AND TRADEMARK OFFICE
CERTIFICATE OF CORRECTION

PATENT NO.         : 7,892,127 B2                                             Page 1 of 1
APPLICATION NO.    : 11/883722
DATED              : February 22, 2011
INVENTOR(S)        : Seiji Tada et al.

It is certified that error appears in the above-identified patent and that said Letters Patent is hereby corrected as shown below:

Title page, item 86 (PCT number)

Please change the listing PCT number to read as follows:

PCT/JP2006/301893

Signed and Sealed this
Seventh Day of June, 2011

David J. Kappos
*Director of the United States Patent and Trademark Office*